United States Patent
Isobe et al.

(10) Patent No.: US 6,564,778 B2
(45) Date of Patent: May 20, 2003

(54) FUEL SUPPLY CONTROL SYSTEM FOR INTERNAL COMBUSTION ENGINE

(75) Inventors: Takashi Isobe, Wako (JP); Manabu Niki, Wako (JP); Kojiro Tsutsumi, Wako (JP); Takashi Iwamoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 37 days.

(21) Appl. No.: 09/876,305

(22) Filed: Jun. 6, 2001

(65) Prior Publication Data

US 2002/0007821 A1 Jan. 24, 2002

(30) Foreign Application Priority Data

Jun. 7, 2000 (JP) ........................................ 2000-170962

(51) Int. Cl.[7] .............................................. F02M 51/00
(52) U.S. Cl. ...................... 123/479; 123/690; 123/698; 123/568.16; 701/107; 701/108
(58) Field of Search ................................. 123/479, 480, 123/690, 698, 568.16; 701/107, 108

(56) References Cited

U.S. PATENT DOCUMENTS

| | | | | |
|---|---|---|---|---|
| 4,640,257 A | * | 2/1987 | Kodama et al. | 123/698 |
| 4,671,107 A | * | 6/1987 | Chiesa et al. | 73/118.2 |
| 4,715,348 A | * | 12/1987 | Kobayashi et al. | 701/107 |
| 5,103,655 A | * | 4/1992 | Kano et al. | 73/118.1 |
| 5,137,004 A | * | 8/1992 | Takahata et al. | 73/116 |
| 5,150,695 A | * | 9/1992 | Kondo | 123/568.16 |
| 5,154,156 A | * | 10/1992 | Ohuchi | 123/568.16 |
| 5,474,051 A | * | 12/1995 | Matsumoto et al. | 123/568.16 |
| 6,382,199 B2 | * | 5/2002 | Nusser et al. | 123/568.16 |

FOREIGN PATENT DOCUMENTS

| | | |
|---|---|---|
| JP | 7-127494 | 5/1995 |
| JP | 7-180615 | 7/1995 |

* cited by examiner

Primary Examiner—Erick Solis
(74) Attorney, Agent, or Firm—Lahive & Cockfield, LLP

(57) ABSTRACT

A fuel supply control system for controlling a fuel amount to be supplied to an internal combustion engine having an exhaust gas recirculation mechanism comprising an exhaust gas recirculation passage connected between an intake pipe and an exhaust pipe, and an exhaust gas recirculation valve provided in the exhaust gas recirculation passage, is disclosed. The fuel amount to be supplied to the engine is corrected according to a pressure difference between an intake pressure detected when opening the exhaust gas recirculation valve and an intake pressure detected when closing the exhaust gas recirculation valve.

42 Claims, 11 Drawing Sheets

FUEL SUPPLY CONTROL SYSTEM FOR INTERNAL COMBUSTION ENGINE

RELATED APPLICATION

This application claims the benefit of priority under 35 U.S.C. 119 to Japanese Application Serial No. 2000-170962, filed Jun. 7, 2000. The Japanese Serial No. 2000-170962 names the same inventors as this application: Ser. No. 09/876,305, FUEL SUPPLY CONTROL SYSTEM FOR INTERNAL COMBUSTION ENGINE.

BACKGROUND OF THE INVENTION

The present invention relates to a fuel supply control system for an internal combustion engine having an exhaust gas recirculation mechanism, and more particularly to such a fuel supply control system for controlling a fuel amount to be supplied to the engine in consideration of the case that the exhaust gas recirculation mechanism is deteriorated to cause a deviation of an exhaust gas recirculation amount from a target value.

After the exhaust gas recirculation mechanism is used over a long period of time, there is a possibility that an exhaust gas recirculation passage or an exhaust gas recirculation valve constituting the exhaust gas recirculation mechanism may be clogged to cause a decrease in exhaust gas recirculation amount from a target value, resulting in an increase in a NOx emission amount. Known is a failure determining method including the steps of measuring an intake pressure when opening the exhaust gas recirculation valve and an intake pressure when closing the exhaust gas recirculation valve in the condition where the operating condition of an internal combustion engine is stable, and determining that the exhaust gas recirculation mechanism has failed if the pressure difference between these intake pressures measured above is smaller than a predetermined value (Japanese Patent Laid-open No. Hei 7-180615).

When exhaust gas recirculation is carried out, an intake air amount is reduced. It is known that such a reduction in the intake air amount is corrected by using an EGR correction coefficient for reducing a fuel supply amount according to the exhaust gas recirculation amount to thereby correct the fuel supply amount (Japanese Patent Laid-open No. Hei 7-127494, for example).

When the deterioration of the exhaust gas recirculation mechanism progresses to such a degree that the failure of the mechanism can be surely determined by the conventional failure determining method mentioned above, the exhaust gas recirculation amount is deviated (decreased) from a target value to cause deterioration in exhaust emission characteristics. Further, in the case of correcting the fuel supply amount by using the EGR correction coefficient as mentioned above, the following problem occurs. That is, in spite of the fact that the actual exhaust gas recirculation amount is decreased from a target value with the progress of deterioration of the exhaust gas recirculation mechanism, the EGR correction coefficient is calculated on the assumption that exhaust gas recirculation corresponding to the target value is executed. As a result, the correction by the EGR correction coefficient becomes excessive (the air-fuel ratio becomes leaner than a desired value), causing increase in the NOx emission amount.

Furthermore, the deterioration in exhaust emission characteristics due to such excessive correction becomes apparent before the degree of deterioration of the exhaust gas recirculation mechanism reaches such a degree that the failure of the mechanism can be surely determined. It is therefore desired to accurately determine the deterioration of the exhaust gas recirculation mechanism, of such a degree that the mechanism has not apparently failed.

SUMMARY OF THE INVENTION

It is accordingly a first object of the present invention to provide a fuel supply control system which can more properly perform the correction of a fuel supply amount in consideration of the deterioration of the exhaust gas recirculation mechanism to thereby maintain good exhaust emission characteristics over a long period of time.

It is a second object of the present invention to provide a fuel supply control system having a function capable of accurately determining the deterioration of the exhaust gas recirculation mechanism, of such a degree that the mechanism has not apparently failed.

In accordance with an aspect of the present invention, there is provided a fuel supply control system for controlling a fuel amount to be supplied to an internal combustion engine having an exhaust gas recirculation mechanism comprising an exhaust gas recirculation passage connected between an intake pipe and an exhaust pipe, and an exhaust gas recirculation valve provided in the exhaust gas recirculation passage. The fuel supply control system includes: an intake pressure sensor for detecting an intake pressure (PBA) of the engine; and correcting means for correcting the fuel amount (TOUT) to be supplied to the engine according to a pressure difference (DPBEGR) between an intake pressure detected when opening the exhaust gas recirculation valve and an intake pressure detected when closing the exhaust gas recirculation valve.

With this configuration, the fuel amount to be supplied to the engine is corrected according to the pressure difference (DPBEGR) between the intake pressure when opening the exhaust gas recirculation valve and the intake pressure when closing the exhaust gas recirculation valve. The pressure difference (DPBEGR) decreases as the degree of deterioration of the exhaust gas recirculation mechanism increases. Accordingly, by increasing the fuel supply amount with a decrease in the pressure difference (DPBEGR), the fuel supply amount can be corrected to a proper value according to the degree of deterioration, to thereby maintain good exhaust emission characteristics over a long period of time.

Preferably, the correcting means corrects the fuel amount so that the fuel amount increases with a decrease in the pressure difference.

Preferably, the correcting means measures the pressure difference when the fuel supply to the engine is interrupted.

Preferably, the fuel supply control system further includes an engine rotational speed sensor for detecting a rotational speed (NE) of the engine. The correcting means corrects the pressure difference according to the detected rotational speed of the engine, and corrects the fuel amount according to the corrected pressure difference.

Preferably, the fuel supply control system further includes an air-fuel ratio sensor provided in the exhaust pipe; air-fuel ratio correcting means for calculating an air-fuel ratio correction coefficient (KO2) according to an output from the air-fuel ratio sensor and correcting the fuel amount by using the calculated air-fuel ratio correction coefficient; and deterioration determining means for determining deterioration of the exhaust gas recirculation mechanism according to a difference (DKO2) between the air-fuel ratio correction coefficient calculated during a period of opening the exhaust gas recirculation valve and the air-fuel ratio correction coefficient calculated during a period of closing the exhaust gas recirculation valve. The correcting means corrects the fuel amount when the deterioration determining means determines that the exhaust gas recirculation mechanism is deteriorated.

Preferably, the deterioration determining means comprises means for calculating a first average (KO2WTEGR) of the air-fuel ratio correction coefficient during opening of the exhaust gas recirculation valve and means for calculating a second average (KO2WOEGR) of the air-fuel ratio correction coefficient during closing of the exhaust gas recirculation valve, and calculates the difference (DKO2) by using the first and second averages.

In accordance with another aspect of the present invention, there is provided a fuel supply control system for controlling a fuel amount to be supplied to an internal combustion engine having an exhaust gas recirculation mechanism comprising an exhaust gas recirculation passage connected between an intake pipe and an exhaust pipe, and an exhaust gas recirculation valve provided in relation to the exhaust gas recirculation passage. The fuel supply control system comprises: an air-fuel ratio sensor provided in the exhaust pipe; air-fuel ratio correcting means for calculating an air-fuel ratio correction coefficient (KO2) according to an output from the air-fuel ratio sensor and correcting the fuel amount by using the calculated air-fuel ratio correction coefficient; and deterioration determining means for determining deterioration of the exhaust gas recirculation mechanism according to a difference (DKO2) between the air-fuel ratio correction coefficient calculated during a period of opening the exhaust gas recirculation valve and the air-fuel ratio correction coefficient calculated during a period of closing the exhaust gas recirculation valve.

With this configuration, the deterioration of the exhaust gas recirculation mechanism is determined according to the difference (DKO2) between the air-fuel ratio correction coefficient calculated during the period of opening the exhaust gas recirculation valve and the air-fuel ratio correction coefficient calculated during the period of closing the exhaust gas recirculation valve. When the air-fuel ratio deviates from a desired value to a lean region, the value of the air-fuel ratio correction coefficient (KO2) increases. Therefore, the absolute value of the difference (DKO2) increases as the degree of deterioration of the exhaust gas recirculation mechanism increases. Accordingly, by determining the degree of deterioration according to the difference (DKO2), the deterioration of the exhaust gas recirculation mechanism, of such a degree that the mechanism has not apparently failed can be accurately determined.

Preferably, the fuel supply control system further comprises correcting means for correcting the fuel amount according to a degree of deterioration of the exhaust gas recirculation mechanism when the difference (DKO2) becomes greater than a predetermined value (DKO2EGRF).

Preferably, the fuel supply control system further comprises an intake pressure sensor for detecting an intake pressure of the engine. The correcting means uses a pressure difference (DPBEGR) between an intake pressure detected when opening the exhaust gas recirculation valve and an intake pressure detected when closing the exhaust gas recirculation valve, as a parameter indicating the degree of deterioration of the exhaust gas recirculation mechanism.

DETAILED DESCRIPTION OF THE PREFERRED EMBODIMENTS

A preferred embodiment of the present invention will now be described with reference to the drawings.

Figure 1:
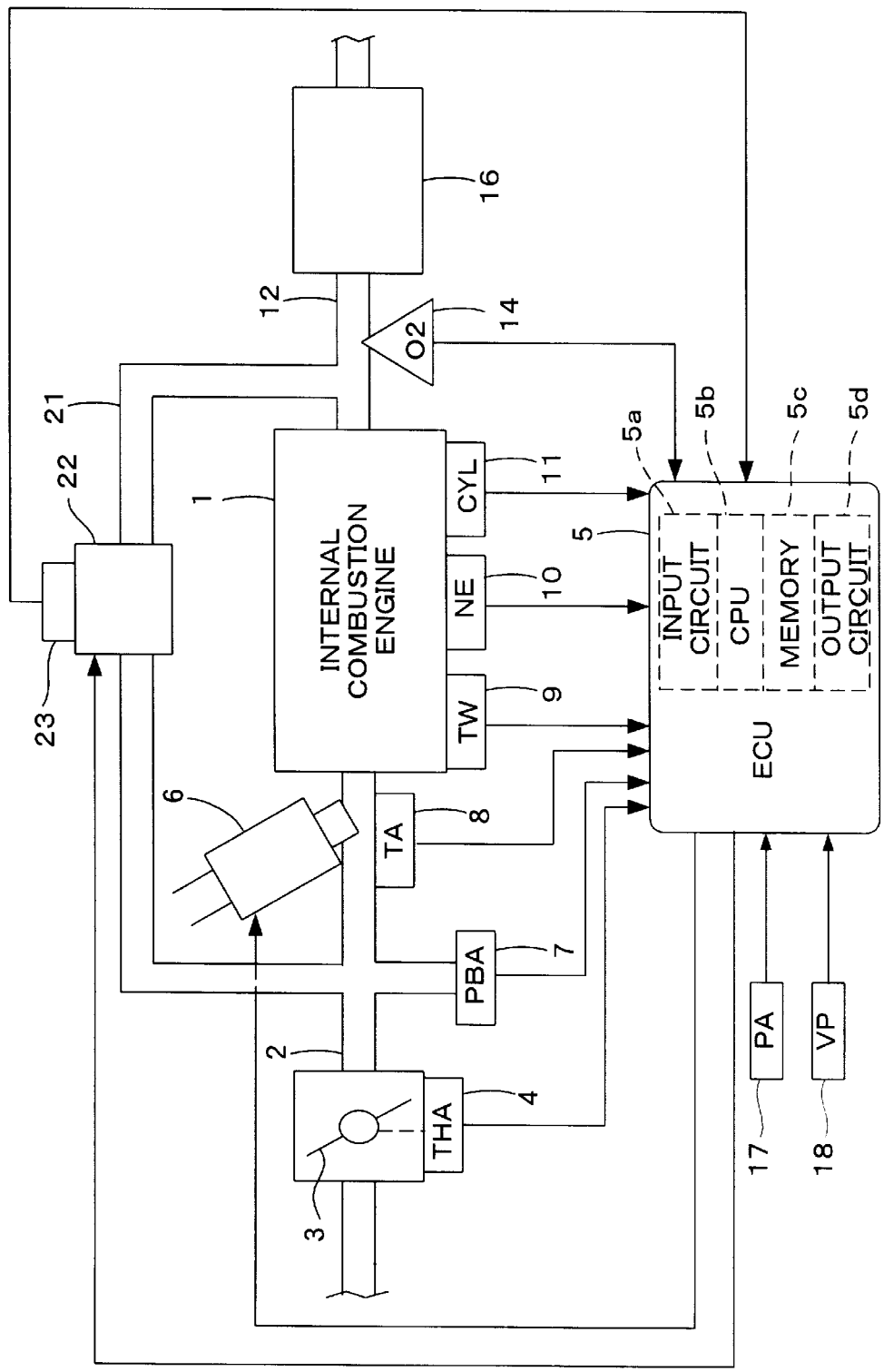
FIG. 1 is a schematic diagram showing the configuration of an internal combustion engine and a fuel supply control system therefor according to a preferred embodiment of the present invention.

Referring to FIG. 1, there is schematically shown a general configuration of an internal combustion engine and a fuel supply control system therefor according to a preferred embodiment of the present invention. The engine 1 is a four-cylinder engine, and it has an intake pipe 2 provided with a throttle valve 3. A throttle valve opening (THA) sensor 4 is connected to the throttle valve 3, so as to output an electrical signal corresponding to a throttle valve opening of the throttle valve 3 and supply the electrical signal to an electronic control unit (which will be hereinafter referred to as "ECU") 5 for controlling the engine 1.

Fuel injection valves 6, for respective cylinders, are inserted into the intake pipe 2 at locations intermediate between the engine 1 and the throttle valve 3 and slightly upstream of respective intake valves (not shown). All the fuel injection valves 6 are connected to a fuel pump (not shown), and electrically connected to the ECU 5. A valve opening period of each fuel injection valve 6 is controlled by a signal from the ECU 5.

An absolute intake pressure (PBA) sensor 7 for detecting a pressure (intake pressure) in the intake pipe 2 is provided immediately downstream of the throttle valve 3. An absolute pressure signal converted to an electrical signal by the absolute intake pressure sensor 7 is supplied to the ECU 5. An intake air temperature (TA) sensor 8 is provided downstream of the absolute intake pressure sensor 8 to detect an intake air temperature TA. An electrical signal corresponding to the detected intake air temperature TA is output from the sensor 8 and supplied to the ECU 5.

An engine coolant temperature (TW) sensor 9 such as a thermistor is mounted on the body of the engine 1 to detect an engine coolant temperature (cooling water temperature)

TW. A temperature signal corresponding to the detected engine coolant temperature TW is output from the sensor 9 and supplied to the ECU 5.

An engine rotational speed (NE) sensor 10 and a cylinder discrimination (CYL) sensor 11 are mounted near the outer periphery of a camshaft or a crankshaft (both not shown) of the engine 1. The engine rotational speed sensor 11 outputs a TDC signal pulse at a crank angle position before a top dead center (TDC) by a predetermined crank angle (at every 180 deg crank angle in the case of a four-cylinder engine). The top dead center (TDC) corresponds to the beginning of an intake stroke of each cylinder of the engine 1. The cylinder discrimination sensor 12 outputs a cylinder discrimination signal pulse at a predetermined crank angle position of a specific cylinder. These signal pulses output from the sensors 10 and 11 are supplied to the ECU 5.

An exhaust pipe 12 of the engine 1 is provided with a three-way catalyst 16 for reducing NOx, HC, and CO contained in exhaust gases. An oxygen concentration sensor (which will be hereinafter referred to as "O2 sensor") 14 as an air-fuel ratio sensor is mounted on the exhaust pipe 12 at a position upstream of the three-way catalyst 16. The 2 sensor 14 outputs an electrical signal corresponding to the oxygen concentration (air-fuel ratio) in the exhaust gases, and supplies the electrical signal to the ECUS.

An exhaust gas recirculation passage 21 is connected between a portion of the intake pipe 2 downstream of the throttle valve 3 and a portion of the exhaust pipe 12 upstream of the three-way catalyst 16. The exhaust gas recirculation passage 21 is provided with an exhaust gas recirculation valve (which will be hereinafter referred to as "EGR valve") 22 for controlling an exhaust gas recirculation amount. The EGR valve 22 is an electromagnetic valve having a solenoid, and its valve opening degree is controlled by the ECU 5. The EGR valve 22 is provided with a lift sensor 23 for detecting the valve opening degree (valve lift) LACT of the EGR valve 22, and a detection signal from the lift sensor 23 is supplied to the ECU 5. The exhaust gas recirculation passage 21 and the EGR valve 22 constitute an exhaust gas recirculation mechanism.

An atmospheric pressure sensor 17 for detecting an atmospheric pressure PA is connected to the ECU 5, and a vehicle speed sensor 18 for detecting a vehicle speed VP of a vehicle driven by the engine 1 is also connected to the ECU 5. Detection signals from these sensors 17 and 18 are supplied to the ECU 5.

The ECU 5 includes an input circuit 5a having various functions including a function of shaping the waveforms of input signals from the various sensors, a function of correcting the voltage levels of the input signals to a predetermined level, and a function of converting analog signal values into digital signal values, a central processing unit (which will be hereinafter referred to as "CPU") 5b, a memory 5c preliminarily storing various operational programs to be executed by the CPU 5b and for storing the results of computation by the CPU 5b, and an output circuit 5d for supplying drive signals to the fuel injection valves 6 and the EGR valve 22.

The ECU 5 determines engine operating conditions according to various engine parameter signals, and sets a valve lift command value LCMD for the EGR valve 22 according to the engine rotational speed NE and the absolute intake pressure PBA. The ECU 5 supplies a control signal to the solenoid of the EGR valve 22 so that a deviation between the valve lift command value LCMD and an actual valve lift LACT detected by the lift sensor 23 becomes zero.

The CPU 5b determines various engine operating conditions such as a feedback control operating condition where an air-fuel ratio is feedback-controlled according to a detected value from the O2 sensor 14 and an open-loop control operating condition, according to various engine parameter signals as mentioned above, and computes a fuel injection period TOUT of each fuel injection valve 6 to be opened in synchronism with the TDC signal pulse, in accordance with Eq. (1). The fuel injection period TOUT is proportional to a fuel injection amount by each fuel injection valve 6, so that it is referred to also as a fuel injection amount in this specification.

$$TOUT = TIM \times KO2 \times [KEGR + (1 - KEGR) \times KEGRFLOW] \times KTOTAL \quad (1)$$

TIM is a basic fuel injection period of each fuel injection valve 6, and it is determined by retrieving a TI map set according to the engine rotational speed NE and the absolute intake pressure PBA. The TI map is set so that the air-fuel ratio of an air-fuel mixture to be supplied to the engine 1 becomes substantially equal to the stoichiometric ratio in an operating condition according to the engine rotational speed NE and the absolute intake pressure PBA.

KO2 is an air-fuel ratio correction coefficient set according to an output from the O2 sensor 14 in the air-fuel ratio feedback control operating condition. In the open-loop control operating condition, the air-fuel ratio correction coefficient KO2 is set to a predetermined value or a learning value according to engine operating conditions.

KEGR is an EGR correction coefficient set to 1.0 (non-correction value) when exhaust gas recirculation is not carried out (when the EGR valve 22 is closed) or set to a value smaller than "1.0" when exhaust gas recirculation is carried out (when the EGR valve 22 is opened) to decrease a fuel injection amount with decrease in the intake air amount.

KEGRFLOW is a deterioration correction coefficient normally set to "0" or set to a larger value in the case that the exhaust gas recirculation mechanism is deteriorated to cause a decrease in exhaust gas recirculation amount. The deterioration correction coefficient KEGRFLOW is used to suppress excessive correction by the EGR correction coefficient KEGR in the case that the exhaust gas recirculation mechanism is deteriorated.

KTOTAL is a coefficient obtained by multiplying all of the other correction coefficients such as a water temperature correction coefficient KTW set according to the engine coolant temperature TW and a high-load incremental correction coefficient KWOT set to a value larger than "1" in a high-load operating condition of the engine.

The CPU 5b supplies a drive signal for each fuel injection valve 6 and a drive signal for the EGR valve 22 through the output circuit 5d, respectively to each fuel injection valve 6 and the EGR valve 22.

Figure 2:
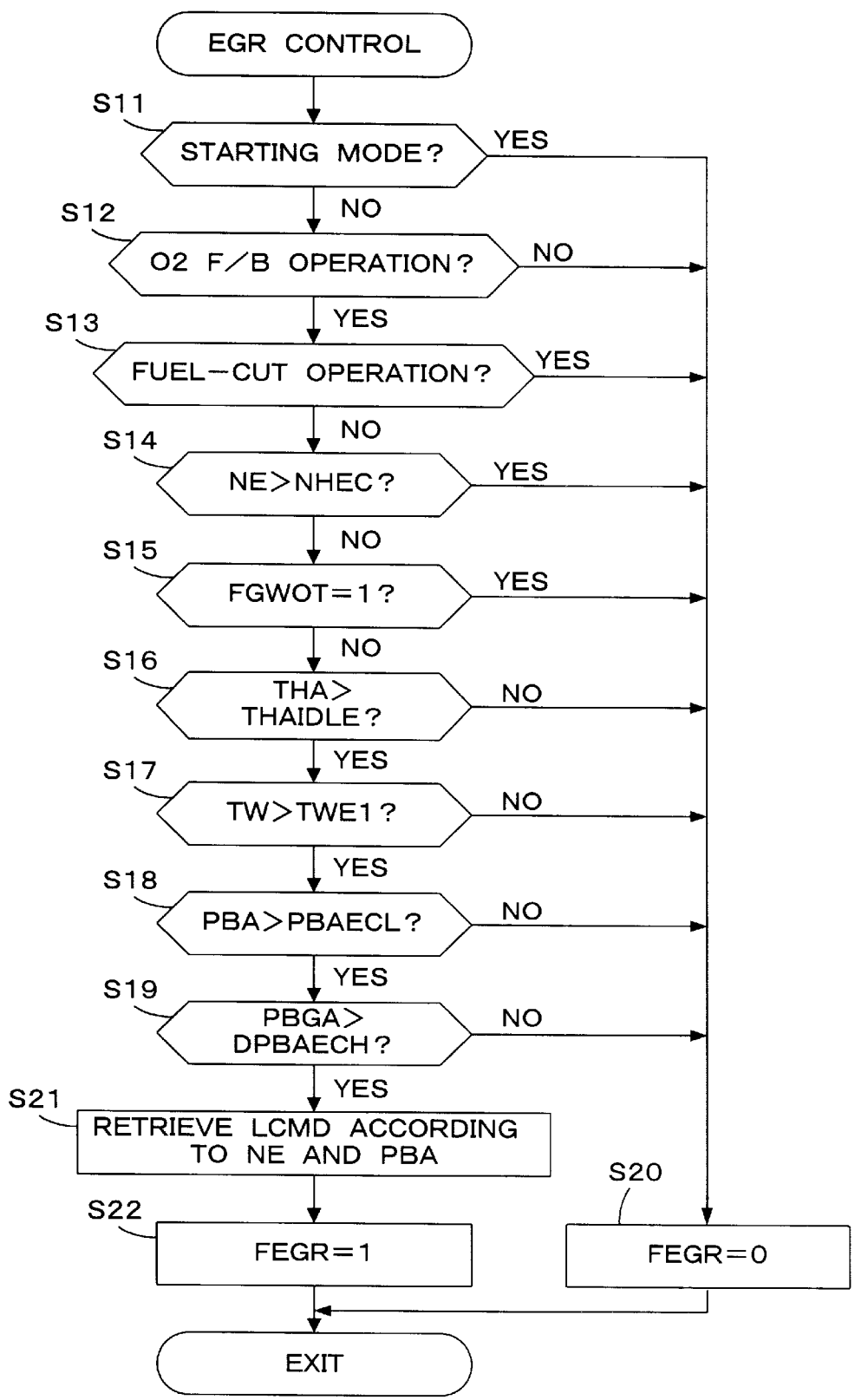
FIG. 2 is a flowchart showing a program for executing exhaust gas recirculation control.

FIG. 2 is a flowchart showing a method for exhaust gas recirculation control. This method is executed by the CPU 5b in synchronism with the generation of a TDC signal pulse.

First, it is determined whether or not the engine 1 is in a predetermined operating condition where the condition for execution of exhaust gas recirculation is satisfied. More specifically, if the engine 1 is in a starting mode (during cranking) (step S11), an EGR execution flag FEGR is set to "0" (step S20). If the air-fuel ratio feedback control using the O2 sensor 14 is not performed(step S12), the EGR execution flag FEGR is set to "0" (step S20). If the engine 1 is in a fuel-cut operation for cutting off the fuel supply to the engine 1 (step S13), the EGR execution flag FEGR is set to "0" (step S20). If the engine rotational speed NE is higher than a predetermined rotational speed NHEC, which indicates that the engine 1 is rotating at high speeds (step S14), the EGR execution flag FEGR is set to "0" (step S20). If a wide-open throttle operation flag FWOT set to "1" (step S15), indicating the fully open condition of the throttle valve 3, the EGR execution flag FEGR is set to "0" (step S20). If the throttle valve opening THA is less than or equal to a predetermined opening THAIDLE, which indicates that the engine 1 is at idling (step S16), the EGR execution flag FEGR is set to "0" (step S20). If the engine coolant temperature TW is less than or equal to a predetermined temperature TWE1 as at cold starting (step S17), the EGR execution flag FEGR is set to "0" (step S20). If the absolute intake pressure PBA is less than or equal to a predetermined pressure PBAECL, which indicates that the engine 1 is in a low-load condition (step S18), the EGR execution flag FEGR is set to "0" (step S20). If a pressure difference PBGA (PA-PBA) between the absolute intake pressure PBA and the atmospheric pressure PA is less than or equal to a predetermined pressure DPBAECH, which indicates that the engine 1 is in a high-load condition (step S19), the EGR execution flag FEGR is set to "0" (step S20). When the EGR execution flag is set to "0", the exhaust gas recirculation is inhibited, so as to prevent degradation in starting performance or operational performance of the engine 1 due to the execution of exhaust gas recirculation.

In contrast, if the starting of the engine 1 is finished, the air-fuel ratio feedback control is performed, the engine 1 is not in the fuel-cut operation, the engine rotational speed NE is lower than or equal to the predetermined rotational speed NHEC, the wide-open throttle operation flag FWOT is "0", the throttle valve opening THA is greater than the predetermined opening THAIDLE, the engine coolant temperature TW is higher than the predetermined temperature TWE1, the absolute intake pressure PBA is higher than the predetermined pressure PBAECL, and the pressure difference PBGA is greater than the predetermined pressure DPBAECH, it is determined that the execution condition for exhaust gas recirculation is satisfied, and an LCMD map (not shown) is retrieved according to the engine rotational speed NE and the absolute intake pressure PBA to calculate a valve lift command value LCMD for the EGR valve 22 (step S21). Then, the EGR execution flag FEGR is set to "1" (step S22), indicating that the execution condition for exhaust gas recirculation is satisfied. Thereafter, this method ends.

Figure 3:
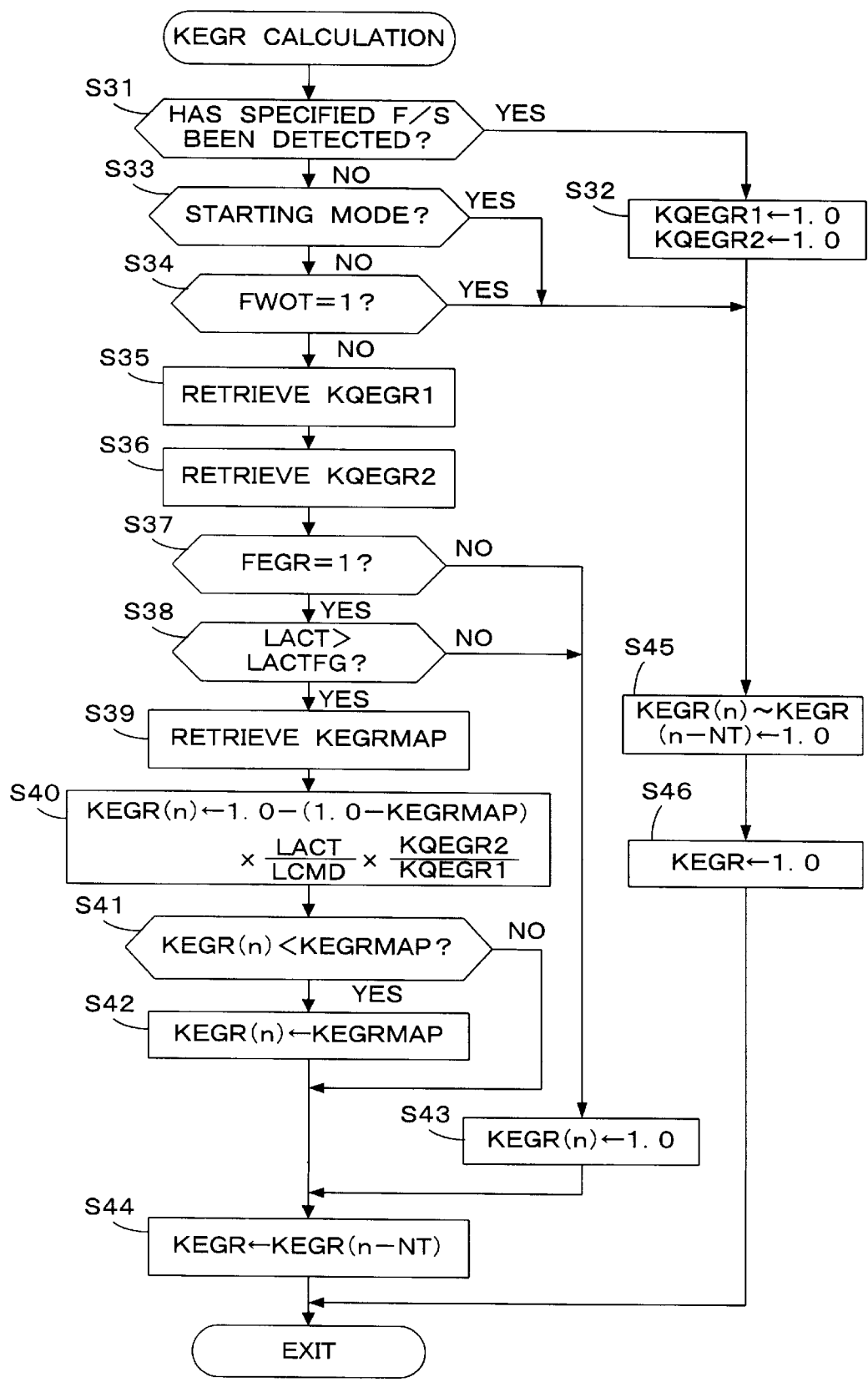
FIG. 3 is a flowchart showing a program for calculating an EGR correction coefficient (KEGR)

FIG. 3 is a flowchart showing a method for calculating the EGR correction coefficient KEGR. This method is executed by the CPU 5b after the processing of FIG. 2 in synchronism with the generation of a TDC signal pulse.

In step S31, it is determined whether or not a preliminarily specified abnormality has been detected. If the abnormality has been detected, a first coefficient value KQEGR1 and a second coefficient value KQEGR2 described below are both set to "1.0" (step S32). Further, all coefficient values KEGR (n) to KEGR(n-NT) stored in a ring buffer are set to "1.0" (step S45), and the EGR correction coefficient KEGR to be applied to Eq. (1) mentioned above is set to "1.0" (step S46). Then, this method ends. "NT" is a number of execution cycles, corresponding to a time period which is necessary for the recirculated gases to move from the EGR valve 22 to the combustion chamber of the engine 1.

In this preferred embodiment, a coefficient value calculated according to an engine operating condition at the execution cycle NT times before (a coefficient value calculated at the time NT times generations of the TDC signal pulse before) is used as the EGR correction coefficient KEGR to be applied to Eq. (1), since there is a time lag due to movement of recirculated gases from the EGR valve 22 to the combustion chamber of the engine 1. Accordingly, the present coefficient value KEGR(n) calculated every time this method is executed is sequentially stored into the ring buffer. The processing of step S45 is for setting all of the (NT+1) coefficient values thus stored in the ring buffer to "1.0".

If the answer to step S31 is negative (NO), it is determined whether or not the engine 1 is in the starting mode (step S33). If the engine 1 is not in the starting mode, it is then determined whether or not the wide-open throttle operation flag FWOT is "1" (step S34). If the engine 1 is in the starting mode or if the engine 1 is in the wide-open throttle operation, the method proceeds to step S45. On the other hand, if the starting of the engine 1 is finished and the engine 1 is not in the wide-open throttle operation, the method proceeds to step S35.

Figure 4:
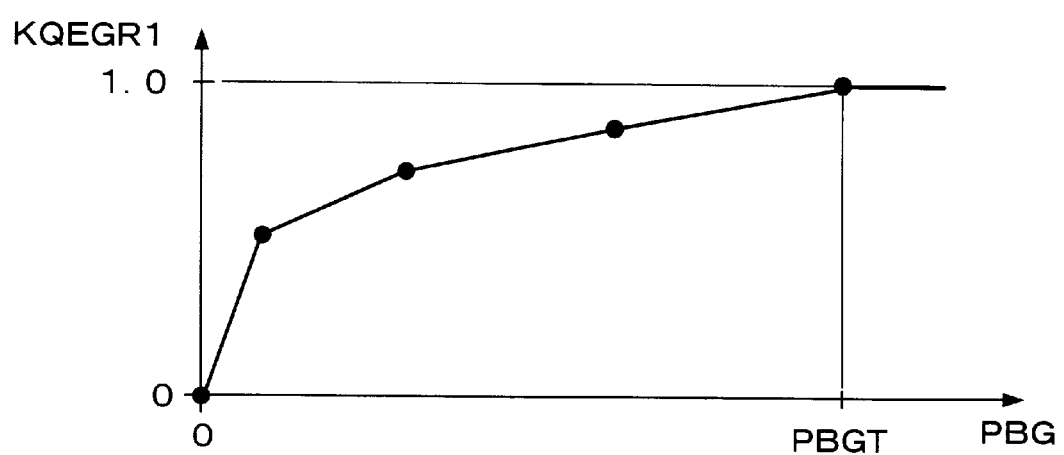
FIG. 4 is a graph showing a table used in the processing of FIG. 3.

In step S35, a KQEGR table shown in FIG. 4 is retrieved according to a pressure difference PBG1 (PA0-PBA) between a reference atmospheric pressure PA0 (=101.3 kPa (760 mmHg)) and the absolute intake pressure PBA to calculate a first coefficient value KQEGR1. The KQEGR table is set so that the coefficient value KQEGR increases with an increase in the pressure difference PBG up to a predetermined pressure PBGT. The predetermined pressure PBGT is typically set to 28 kPa (210 mmHg), for example.

In step S36, the KQEGR table shown in FIG. 4 is retrieved according to a pressure difference PBG2 between a current atmospheric pressure PA and the absolute intake pressure PBA to calculate a second coefficient value KQEGR2.

Then, it is determined whether or not the EGR execution flag FEGR is "1" (step S37). If FEGR is "0", which indicates that the exhaust gas recirculation is not carried out, the present value KEGR(n) of the EGR correction coefficient is set to "1.0" (step S43) and the method then proceeds to step S44. If FEGR is "1", which indicates that the exhaust gas recirculation is carried out, it is determined whether or not the actual valve lift LACT of the EGR valve 22 is larger than a predetermined valve lift LACTFG (step S38). If LACT is less than or equal to LACTFG, which indicates that the actual valve lift LACT is almost zero, the method proceeds to step S43.

If LACT is greater than LACTFG in step S38, a map value KEGRMAP is calculated according to the engine rotational speed NE and the absolute intake pressure PBA (step S39). Thereafter, the map value KEGRMAP, the actual valve lift LACT, the valve lift command value LCMD, and the first and second coefficient values KQEGR1 and KQEGR2 are applied to Eq. (2) shown below to calculate the present value KEGR(n) of the EGR correction coefficient (step S40).

$$KEGR(n)=1.0-(1.0-KEGRMAP) \times (LACT/LCMD) \times (KQEGR2/KQEGR1) \quad (2)$$

where LACT/LCMD is a correction term for correcting a delay of a change in the actual valve lift LACT to a change in the valve lift command value LCMD in a transient condition where the valve lift of the EGR valve 22 is changing, and KQEGR2/KQEGR1 is a correction term for correcting an influence of a change in the atmospheric pressure PA.

In step S41, it is determined whether or not the present value KEGR(n) calculated in step S40 is less than the map value KEGRMAP. If KEGR(n) is less than KEGRMAP, the present value KEGR(n) is replaced to the map value KEGRMAP (step S42), and the method proceeds to step S44. If KEGR(n) is greater than or equal to KEGRMAP, the method proceeds directly to step S44.

In step S44, the EGR correction coefficient KEGR to be applied to Eq. (1) is set to the NT times-before coefficient value KEGR(n−NT). Then, this method ends.

Figure 5:
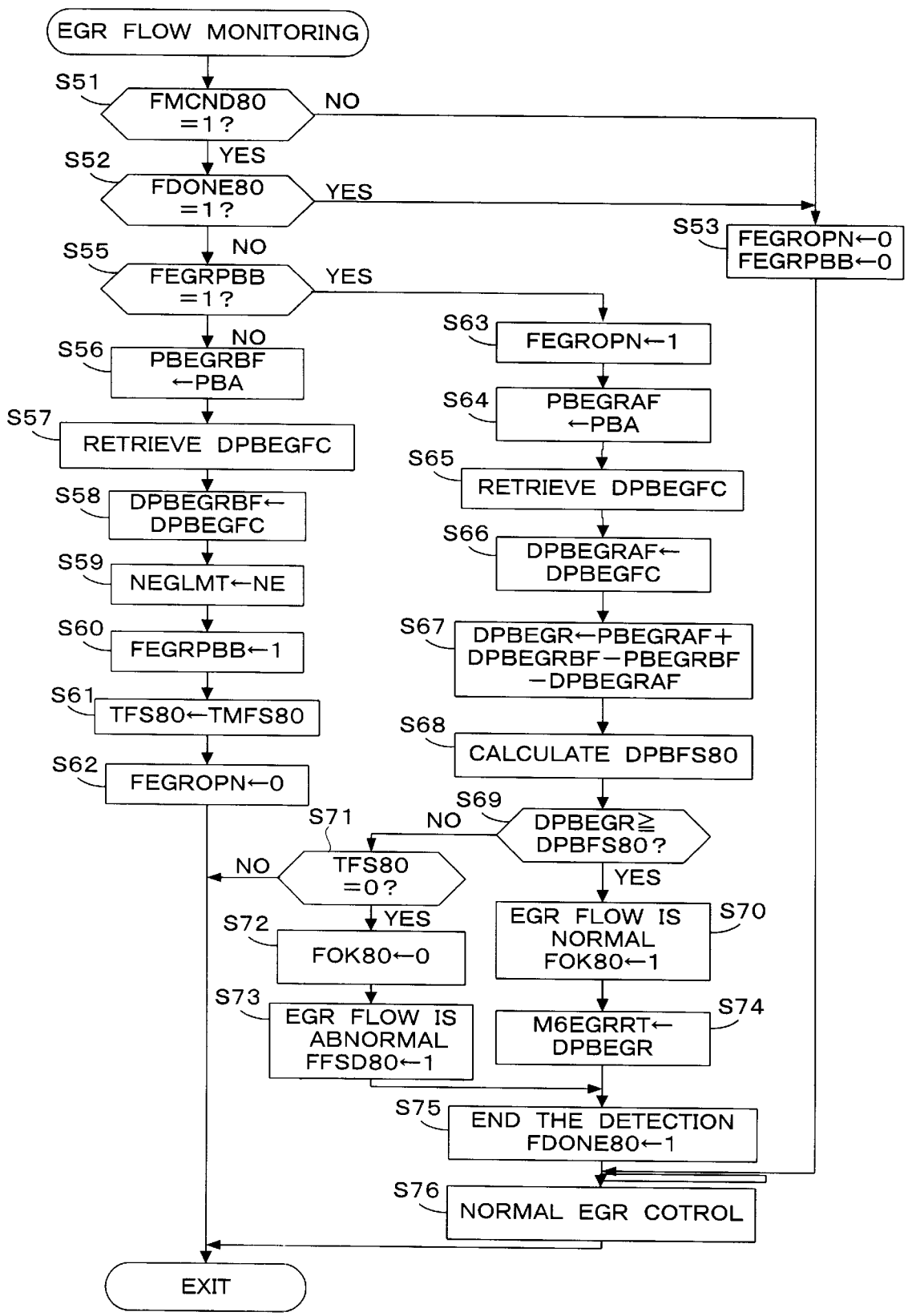
FIG. 5 is a flowchart showing a program for monitoring an exhaust gas recirculation amount.

FIG. 5 is a flowchart showing a method for monitoring a flow in the exhaust gas recirculation passage 21. This method is executed by the CPU 5b in synchronism with the generation of a TDC signal pulse.

Figure 8:
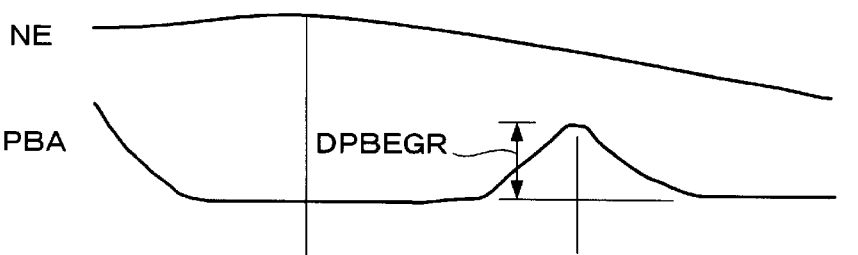
FIGS. 8A to 8D are time charts for illustrating the processing of FIG. 5.

In step S51, it is determined whether or not a monitoring permission flag FMCND80 is "1", indicating that the execution of flow monitoring is permitted. The monitoring permission flag FMCND80 is set in the processing shown in FIG. 8 described below. If FMCND80 is "0", a valve opening command flag FEGROPN and an intake pressure measurement end flag FEGRPBB are set to "0" (step S53). The flag FEGROPEN when set to "1" indicates that the EGR valve 22 is opened for the purpose of flow monitoring, and the flag FEGRPBB when set to "1" indicates that the measurement of an absolute intake pressure PBA before opening of the EGR valve 22 is finished. Then, normal EGR control is performed (step S76).

If the monitoring permission flag FMCND80 is "1" in step S51, it is determined whether or not an end flag FDONE80 is "1" (step S52), indicating that the flow monitoring is finished. If FDONE80 is "1", the method proceeds to step S53.

Figure 6A:
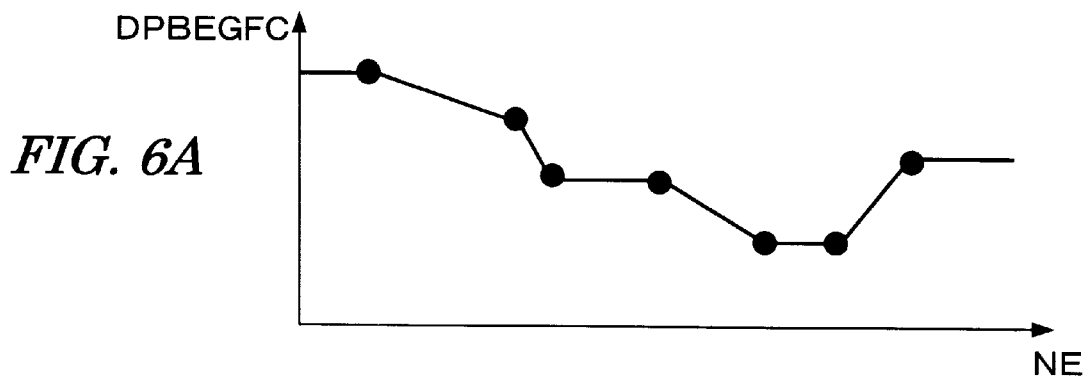
FIGS. 6A and 6B are graphs showing tables used in the processing of FIG. 5.

If FDONE80 is "0", it is determined whether or not the intake pressure measurement end flag FEGRPBB is "1" (step S55). Since FEGRPBB is "0" at first, the method proceeds to step S56, in which the present absolute intake pressure PBA is stored as a before-valve-opening intake pressure PBEGRBF (hereinafter referred to as "BVO intake pressure PBEGRBF"). Then, a DPBEGFC table shown in FIG. 6A is retrieved according to the engine rotational speed NE to calculate a correction value DPBEGFC (step S57), and this correction value DPBEGFC is stored as a before-valve-opening correction value DPBEGRBF (hereinafter referred to as "BVO correction value DPBEGRBF")(step S58). The BVO correction value DPBEGRBF is used in step S67 described below.

In step S59, the present engine rotational speed NE is stored as a before-valve-opening engine rotational speed NEGLMT (hereinafter referred to as "BVO engine rotational speed NEGLMT"). Then, the intake pressure measurement end flag FEGRPBB is set to "1" (step S60). A down-count timer TFS80 to be referred to in step S71 is set to a predetermined time TMFS80 (e.g., 1.5 seconds), and then started (step S61). The valve opening command flag FEGROPN is then set to "0" (step S62). Thereafter, this method ends.

After the intake pressure measurement end flag FEGRPBB is set to "1" in step S60, the method proceeds from step S55 to step S63, in which the valve opening command flag FEGROPN is set to "1". Then, the present absolute intake pressure PBA is stored as an after-valve-opening intake pressure PBEGRAF (hereinafter referred to as "AVO intake pressure PBEGRAF")(step S64). As in step S57, the DPBEGFC table shown in FIG. 6A is next retrieved according to the engine rotational speed NE to calculate a correction value DPBEGFC (step S65), and the calculated correction value DPBEGFC is stored as an after-valve-opening correction value DPBEGRAF (hereinafter referred to as "AVO correction value DPBEGRAF")(step S66).

In step S67, the AVO intake pressure PBEGRAF, the BVO intake pressure PBEGRBF, the AVO correction value DPBEGRAF, and the BVO correction value DPBEGRBF are applied to Eq. (3) shown below to calculate an intake pressure change DPBEGR between the intake pressure before opening the EGR valve 22 and the intake pressure after opening the EGR valve 22 (step S67).

$$DPBEGR = PBEGRAF + DPBEGRBF - PBEGRBF - DPBEGRAF \quad (3)$$

where the correction values DPBEGRBF and DPBEGRAF are applied to eliminate an influence of a change in the engine rotational speed NE upon the absolute intake pressure PBA.

Figure 6B:
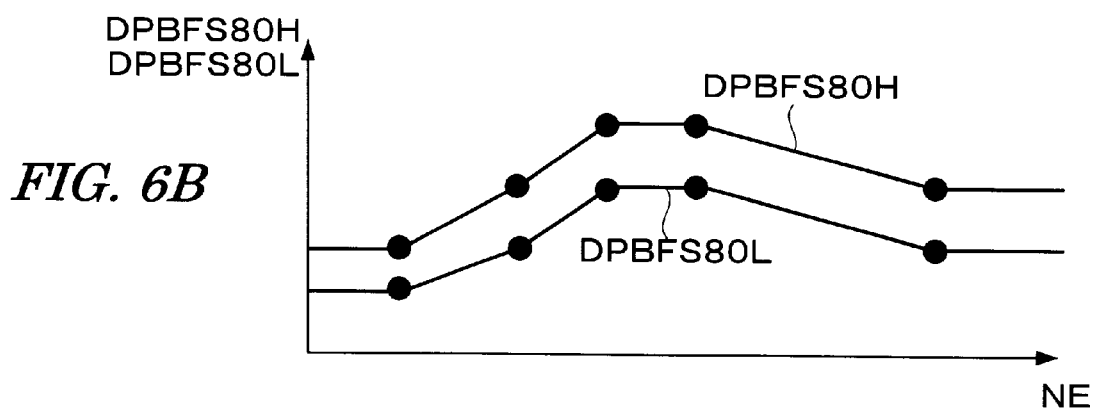

In step S68, a determination threshold DPBFS80 is calculated according to the engine rotational speed NE and the atmospheric pressure PA. More specifically, a DPBFS80H table and a DPBFS80L table shown in FIG. 6B are retrieved according to the engine rotational speed NE to calculate a low-altitude determination threshold DPBFS80H corresponding to a low-altitude atmospheric pressure (e.g., 100 kPa (750 mmHg)) and a high-altitude determination threshold DPBFS80L corresponding to a high-altitude atmospheric pressure (e.g., 53.3 kPa (400 mmHg)), and the determination threshold DPBFS80 is calculated by an interpolation according to the detected atmospheric pressure PA.

In step S69, it is determined whether or not the intake pressure change DPBEGR calculated in step S67 is greater than or equal to the determination threshold DPBFS80. Immediately after opening the EGR valve 22, the intake pressure change DPBEGR is small. Accordingly, the method proceeds to step S71, in which it is determined whether or not the count value of the timer TFS80 started in step S61 is "0". If TFS80 is greater than 0, the method ends.

In the subsequent cycles, steps S63 to S69 and step S71 are repeatedly executed, during which if DPBEGR becomes greater than or equal to DPBFS80 in step S69 before the count value of the timer TFS80 becomes "0", it is determined that the EGR flow is normal, and an OK flag FOK80 is set to "1" (step S70), indicating that the EGR flow is normal. Then, the intake pressure change DPBEGR calculated in step S67 is stored as a memory value M6EGRRT (step S74), and the end flag FDONE80 is set to "1" (step S75). Thereafter, the normal EGR control is performed (step S76).

On the other hand, if the condition that DPBEGR is less than DPBFS80 in step S69 is continued and the count value of the timer TFS80 becomes "0", it is determined that the EGR flow is abnormal. Accordingly, the OK flag FOK80 is set to "0", and an NG flag FFSD80 is set to "1" (steps S72 and S73), indicating the EGR flow is abnormal. Thereafter, the method proceeds to step S75.

According to the processing of FIG. 5, the pressure difference (PBEGRAF−PBEGRBF) between the intake pressure PBEGRBF before opening the EGR valve 22 and the intake pressure PBEGRAF after opening the EGR valve 22 is corrected by the correction values DPBEGRBF and DPBEGRAF to thereby calculate the intake pressure change DPBEGR. Then, if the intake pressure change DPBEGR is less than the determination threshold DPBFS80, it is determined that the EGR flow is abnormal.

Figure 7:
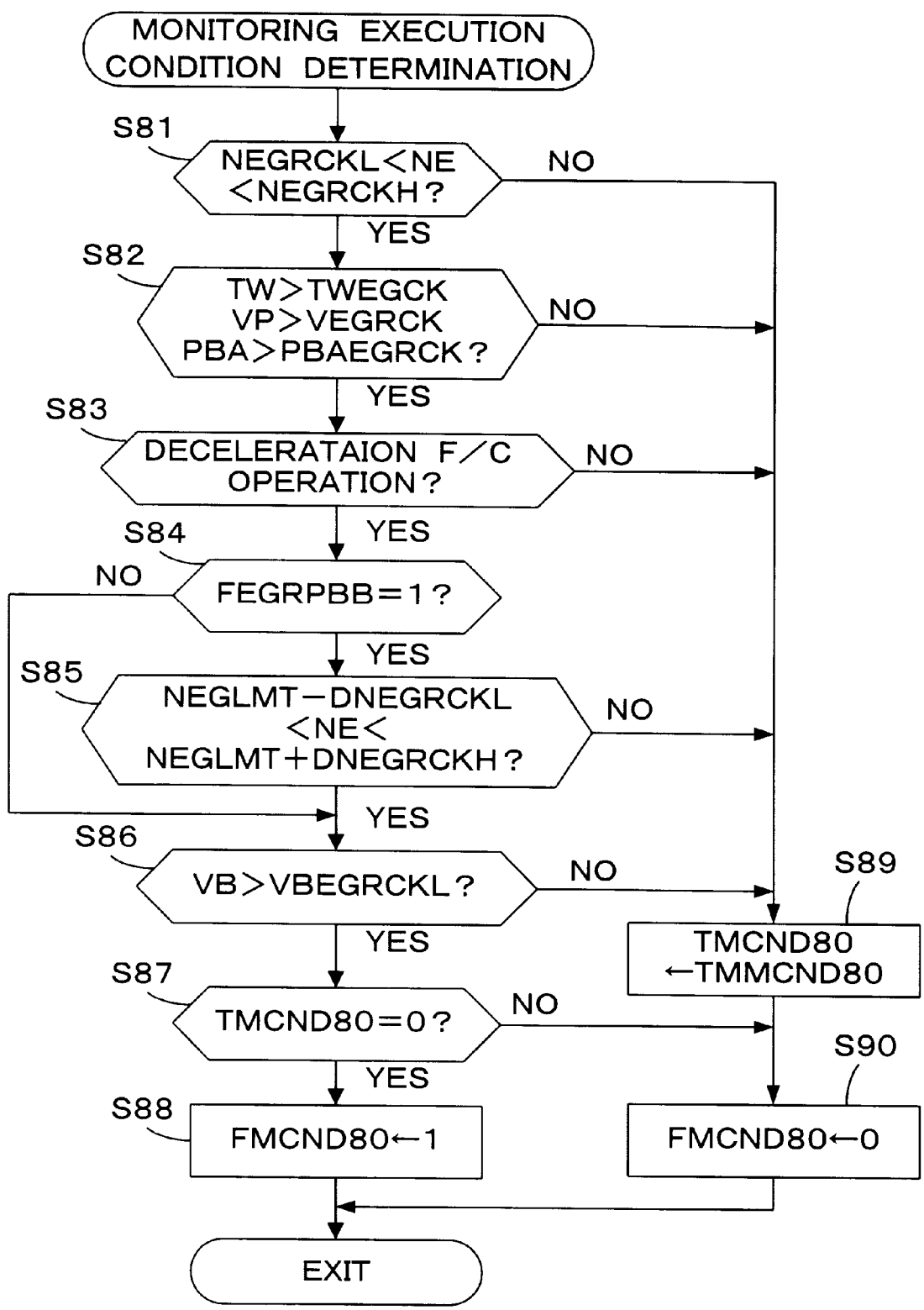
FIG. 7 is a flowchart showing a program for setting an execution permission flag for the flow monitoring by the processing of FIG. 5.

FIG. 7 is a flowchart showing a method for determining the execution condition of monitoring to set the monitoring permission flag FMCND80 to be referred in step S51 shown in FIG. 5. This method is executed by the CPU 5b in synchronism with the generation of a TDC signal pulse.

In step S81, it is determined whether or not the engine rotational speed NE is in the range between a predetermined upper limit NEGRCKH (e.g., 2000 rpm) and a predetermined lower limit NEGRCKL (e.g., 1400 rpm). If NE is lower than or equal to NEGRCKL or NE is higher than or equal to NEGRCKH, a down-count timer TMCND80 is set to a predetermined time TMMCND80 (e.g., 2 seconds), and started (step S89). Then, the monitoring permission flag FMCND80 is set to "0" (step S90), and the method ends.

If NE is higher than NEGRCKL and less than NEGRCKH, it is determined whether or not the engine coolant temperature TW is higher than a predetermined temperature TWEGCK (e.g., 70° C.), the vehicle speed VP is higher than a predetermined speed VEGRCK (e.g., 56 km/h), and the absolute intake pressure PBA is higher than a predetermined pressure PBAEGRCK (e.g., 15 kPa) (step S82). If the answer to step S82 is negative (NO), the method proceeds to step S89. If the answer to step S82 is affirmative (YES), it is determined whether or not a deceleration fuel-cut operation, in which the vehicle is during deceleration and the fuel supply to the engine 1 is interrupted, is performed (step S83). If the deceleration fuel-cut operation is not performed, the method proceeds to step S89. If the deceleration fuel-cut operation is performed, it is determined whether or not the intake pressure measurement end flag FEGRPBB set in the processing of FIG. 5 is "1" (step S84). While the monitoring permission flag FMCND80 is "0", the flag FEGRPBB is "0". Accordingly, the method proceeds directly to step S86.

On the other hand, while the flow monitoring is executed, the flag FEGRPBB is "1". Therefore, the method proceeds to step S85, in which it is determined whether or not the engine rotational speed NE is in the range between a lower limit (NEGLMT−DNEGRCKL) and an upper limit (NEGLMT+DNEGRCKH) where NEGLMT is the BVO engine rotational speed as stored in step S59 shown in FIG. 5, and DNEGRCKL and DNEGRCKH are predetermined rotational speeds set to 128 rpm and 64 rpm, respectively.

If the answer to step S85 is negative (NO), it is determined that the engine rotational speed NE has rapidly changed from the engine rotational speed before valve opening NEGLMT, causing a high possibility of improper determination. Therefore, the method proceeds to step S89, so as to interrupt the flow monitoring.

If the answer to step S85 is affirmative (YES), the method proceeds to step S86, in which it is determined whether or not a battery voltage VB is higher than a predetermined voltage VBEGRCKL (e.g., 11 V). If VB is lower than or equal to VBEGRCKL, the method proceeds to step S89, whereas if VB is higher than VBEGRCKL, it is determined whether or not the count value of the timer TMCND80 is "0" (step S87). If TMCND80 is greater than "0", the method proceeds to step S90. When TMCND80 becomes "0", the monitoring permission flag FMCND80 is set to "1" to permit the execution of the flow monitoring (step S88).

FIGS. 8A to 8D are time charts for illustrating the operation by the processings of FIGS. 5 and 7. When the deceleration fuel-cut operation is started at time t1, the monitoring permission flag FMCND80 is set to "1" slightly before time t2 to perform the measurement of the intake pressure before valve opening PBEGRBF, and a valve opening command to the EGR valve 22 is issued at time t2 (FIG. 8C). As a result, the actual valve lift LACT of the EGR valve 22 is gradually increased as shown in FIG. 8D, and the absolute intake pressure PBA is also gradually increased. At time t3, the measurement of the AVO intake pressure PBEGRAF is performed and a valve closing command to the EGR valve 22 is issued to end the flow monitoring.

Figure 9:
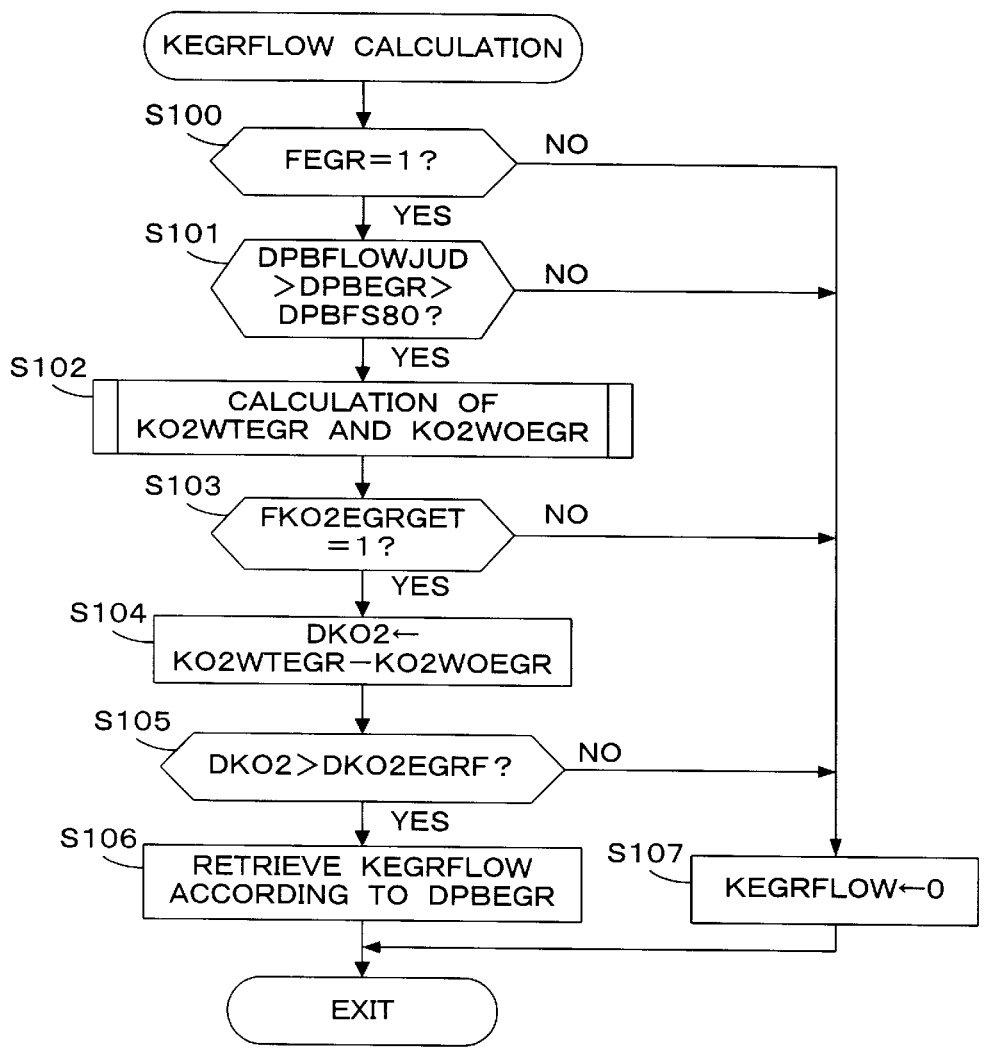
FIG. 9 is a flowchart showing a program for calculating a deterioration correction coefficient (KEGRFLOW)

FIG. 9 is a flowchart showing a method for calculating the deterioration correction coefficient KEGRFLOW to be applied to Eq. (1) mentioned above. This method is executed by the CPU 5b in synchronism with the generation of the TDC signal pulse.

In step S100, it is determined whether or not the EGR execution flag FEGR is "1". If FEGR is "0", the method proceeds directly to step S107, in which the deterioration correction coefficient KEGRFLOW is set to "0". If FEGR is "1", which indicates that the exhaust gas recirculation is executed, it is determined whether or not the intake pressure change DPBEGR calculated in the processing of FIG. 5 is greater than the determination threshold DPBFS80 for determination of abnormality as mentioned above and less than a predetermined value DPBFLOWJUD (which is set to a value (e.g., 2 kPa (15 mmHg) greater than the determination threshold DPBFS80) (step S101). If DPBEGR is greater than or equal to DPBFLOWJUD or DPBEGR is less than or equal to DPBFS80, the method proceeds to step S107.

Figure 11:
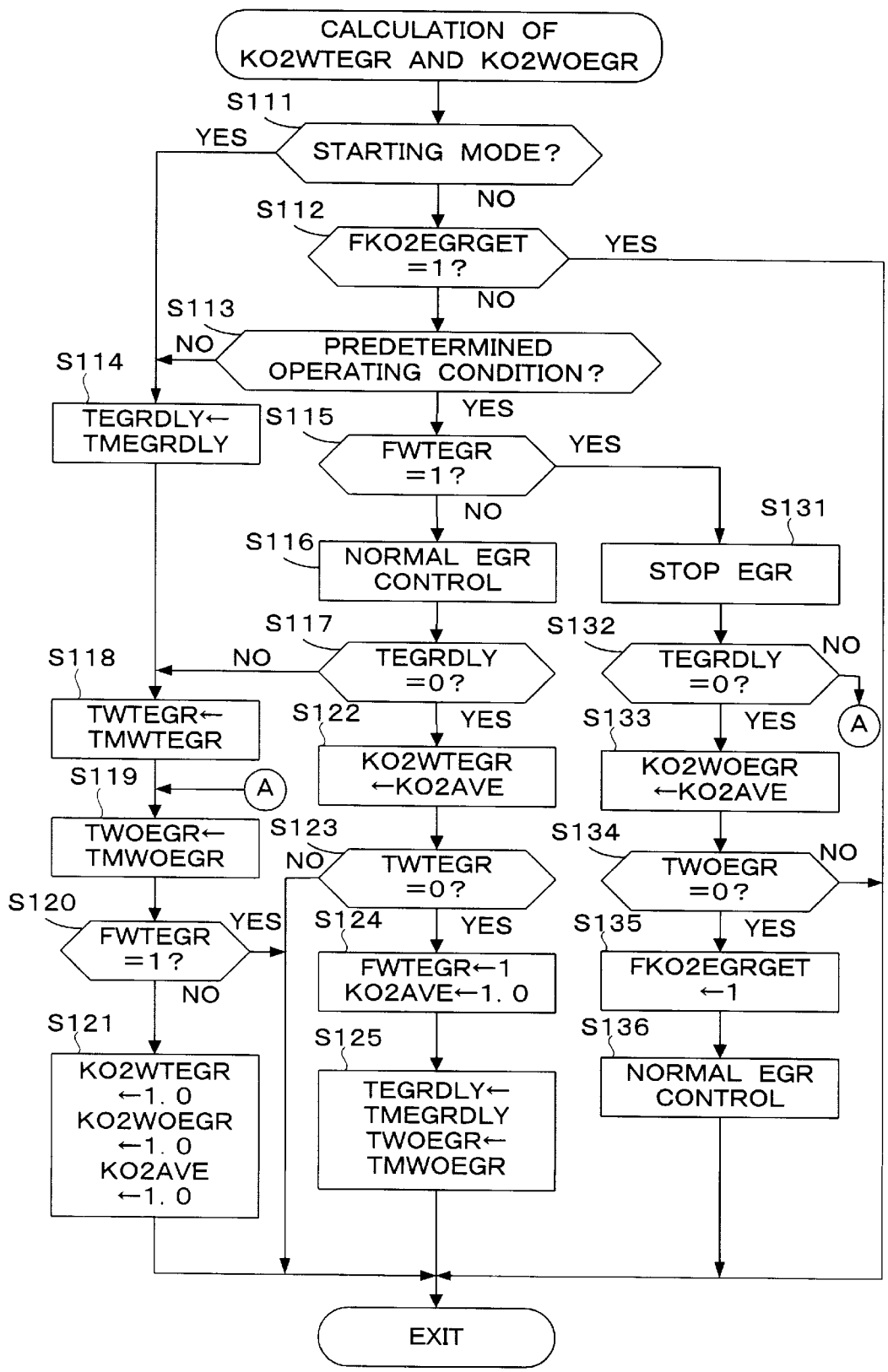
FIG. 11 is a flowchart showing a part of the processing of FIG. 9 in detail.

If DPBEGR is greater than DPBFS80 and less than DPBFLOWJUD, a method for calculation of KO2WTEGR and KO2WOEGR shown in FIG. 11 is executed (step S102). The method shown in FIG. 11 is a method for calculating an average KO2WTEGR of the air-fuel ratio correction coefficient KO2 during execution of EGR (hereinafter referred to as "EGR-ON KO2 average KO2WTEGR") and an average KO2WOEGR of the air-fuel ratio correction coefficient KO2 during non-execution of EGR (hereinafter referred to as "EGR-OFF KO2 average KO2WOEGR") in a stable operating condition of the engine 1. After the calculation of both averages is finished, a calculation end flag FKO2EGRGET is set to "1".

In step S103, it is determined whether or not the calculation end flag FKO2EGRGET is "1". If FKO2EGRGET is "0", the method proceeds to step S107. If FKO2EGRGET is "1", which indicates that the calculation of the EGR-ON KO2 average KO2WTEGR and the EGR-OFF KO2 average KO2WOEGR has been ended, a difference DKO2 between these two averages is calculated from Eq. shown below.

$$DKO2 = KO2WTEGR - KO2WOEGR$$

Then, it is determined whether or not the difference DKO2 is greater than a predetermined value DKO2EGRF (e.g., 0.03) (step S105). If DKO2 is less than or equal to DKO2EGRF, it is determined that the correction by the EGR correction coefficient KEGR is not excessive correction, and the method proceeds to step S107.

Figure 10:
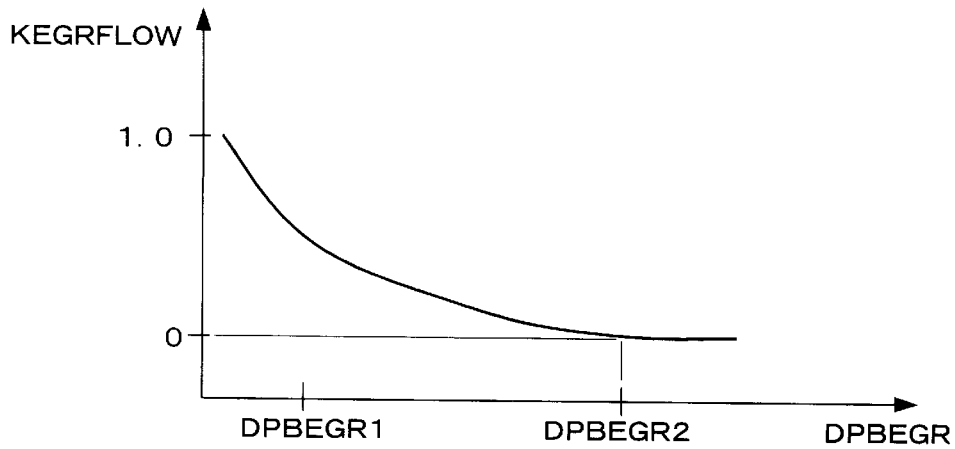
FIG. 10 is a graph showing a table used in the processing of FIG. 9.

If DKO2 is greater than DKO2EGRF, it is determined that the EGR correction coefficient KEGR has been set to a value smaller than a desired value corresponding to an actual exhaust recirculation amount and that the correction by the EGR correction coefficient KEGR becomes excessive correction. Then, a KEGRFLOW table shown in FIG. 10 is retrieved according to the intake pressure change DPBEGR to calculate a deterioration correction coefficient KEGRFLOW (step S106). The KEGRFLOW table is set so that the deterioration correction coefficient KEGRFLOW increases with a decrease in the intake pressure change DPBEGR (with the progress of deterioration of the exhaust gas recirculation mechanism). In FIG. 10, DPBEGR1 and DPBEGR2 denote predetermined pressures set to 0.7 kPa (5 mmHg) and 2 kPa (15 mmHg), respectively.

By applying the calculated deterioration correction coefficient KEGRFLOW to Eq. (1) mentioned above, the excessive correction by the EGR correction coefficient KEGR can be eliminated to thereby maintain good exhaust emission characteristics over a long period of time.

FIG. 11 is a flowchart showing a method for calculating the EGR-ON KO2 average KO2WTEGR and the EGR-OFF KO2 average KO2WOEGR used in step S102 shown in FIG. 9.

In step S111, it is determined whether or not the engine 1 is in the starting mode. If the engine 1 is in the starting mode, down-count timers TEGRDLY, TWTEGR, and TWOEGR to be referred in the subsequent steps are set respectively to predetermined periods TMEGRDLY (e.g., 1 second), TMWTEGR (e.g., 12 seconds), and TMWOEGR (e.g., 10 seconds), and started (steps S114, S118, and S119). Then, it is determined whether or not an EGR-ON average calculation end flag FWTEGR is "1" (step S120). The flag FWTEGR indicates when set to "1" that the calculation of the EGR-ON KO2 average KO2WTEGR is finished. The flag FWTEGR is set to "1" in step S124 described below. Therefore, the method at first proceeds to step S121, in which the average KO2WTEGR, the average KO2WOEGR, and an averaged value KO2AVE of the air-fuel ratio correction coefficient KO2 (see Eq. (4) described below) are all set to "1.0" (step S121). Then, the method ends.

If the engine 1 is not in the starting mode, that is, if the engine 1 is in a normal operating condition, the method proceeds from step S111 to step S112, in which it is determined whether or not the calculation end flag FKO2EGRGET is "1". Since FKO2EGRGET is "0" at first, the method proceeds to step S113, in which it is determined whether or not the engine operating condition is a predetermined operating condition. The predetermined operating condition is defined as a steady operating condition of the engine 1, e.g., a constant-speed cruising condition where the engine rotational speed NE and the absolute intake pressure PBA are substantially constant.

If the engine operating condition is not the predetermined operating condition, the method proceeds to step S114. If the engine operating condition is the predetermined operating condition, it is determined whether or not the EGR-ON average calculation end flag FWTEGR is "1" (step S115). Since FWTEGR is "0" at first, the method proceeds to step S116, in which the normal EGR control is executed, and it is determined whether or not the value of the timer TEGRDLY is "0" (step S117).

If TEGRDLY is greater than "0", the method proceeds to step S118. If TEGRDLY is "0", the EGR-ON KO2 average KO2WTEGR is set to the averaged value KO2AVE of the air-fuel ratio correction coefficient KO2 (step S122). The averaged value KO2AVE is calculated from Eq. (4) shown below.

$$KO2AVE = A \times KO2 + (1-A) \times KO2AVE \quad (4)$$

where A is an averaging coefficient set to a value (e.g., 0.5) between 0 and 1, and KO2AVE on the right side is the previous value of the averaged value.

In step S123, it is determined whether or not the value of the timer TWTEGR is "0". Since TWTEGR is greater than "0" at first, the method immediately ends. Subsequently, step S122 is repeatedly executed to thereby update the EGR-ON KO2 average KO2WTEGR. If TWTEGR becomes "0" in step S123, the EGR-ON average calculation end flag FWTEGR is set to "1", and the averaged value KO2AVE is set to "1.0" (step S124). Further, the timers TEGRDLY and TWOEGR are set respectively to predetermined periods TMEGRDLY and TMWOEGR, and started (step S125). Thereafter, the method ends.

After the EGR-ON average calculation end flag FWTEGR is set to "1" in step S124, the method proceeds from step S115 to step S131, in which the EGR valve 22 is fully closed to stop the exhaust gas recirculation. Then, it is determined whether or not the value of the timer TEGRDLY is "0" (step S132). If TEGRDLY is greater than "0" in step S132, the method proceeds to step S119. If TEGRDLY is "0" in step S132, the EGR-OFF KO2 average KO2WOEGR is set to the averaged value KO2AVE calculated from Eq. (4) mentioned above (step S133), and it is determined whether or not the value of the timer TWOEGR is "0" (step S134). Since TWOEGR is greater than "0" at first, step S133 is repeatedly executed to thereby update the EGR-OFF KO2 average KO2WOEGR. If TWOEGR becomes "0" in step S134, the calculation end flag FKO2EGRGET is set to "1" (step S135), and the exhaust gas recirculation is restarted to execute the normal EGR control (step S136).

Thus, the EGR-ON KO2 average KO2WTEGR and the EGR-OFF KO2 average KO2WOEGR are calculated by the processing of FIG. 11.

Figure 12:
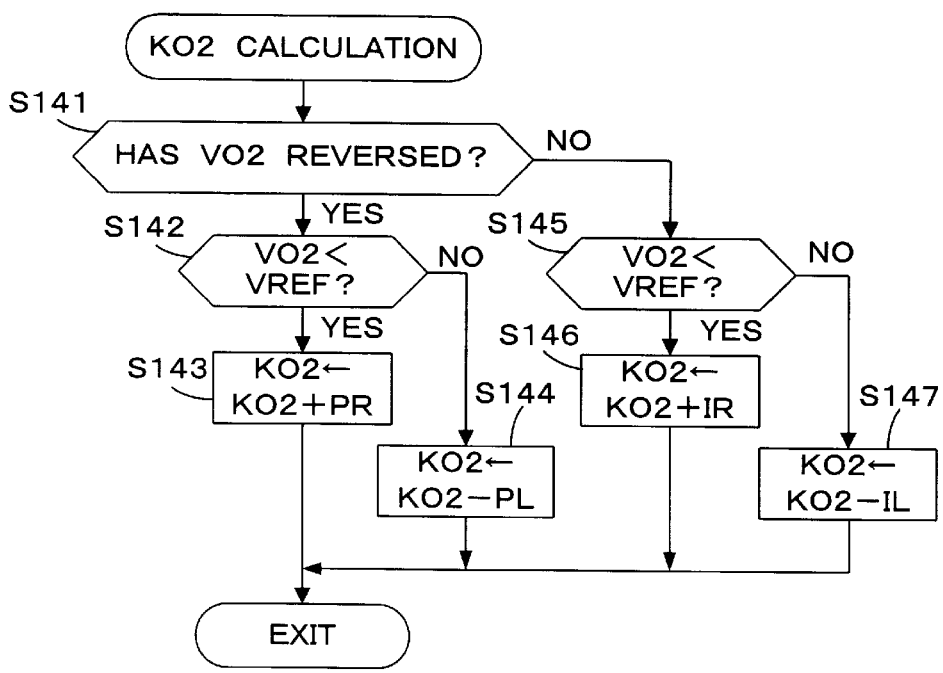
FIG. 12 is a flowchart showing a program for calculating an air-fuel ratio correction coefficient (KO2)

FIG. 12 is a flowchart showing a KO2 feedback control method for calculating the air-fuel ratio correction coefficient KO2 according to the output from the O2 sensor 14 in the air-fuel ratio feedback control operating condition of the engine 1. This method is executed by the CPU 5b in synchronism with the generation of the TDC signal pulse.

In step S141, it is determined whether or not the relation between an output VO2 from the O2 sensor 14 and a reference value VREF has been reversed in magnitude (i.e., the relation that VO2 is higher than VREF has been changed to the relation that VO2 is lower than VREF, or vice versa). If the relation between the output VO2 and the reference value VREF has been reversed in magnitude, which indicates the update timing by a proportional term PR or PL, it is then determined whether or not the output VO2 is lower than the reference value VREF (step S142). If VO2 is lower than VREF, the proportional term PR is added to the correction coefficient KO2 to thereby update the correction coefficient KO2 (step S143). If VO2 is higher than VREF, the proportional term PL is subtracted from the correction coefficient KO2 to thereby update the correction coefficient KO2 (step S144). Then, this method ends.

On the other hand, if the relation between the output VO2 and the reference value VREF has not been reversed in magnitude in step S141, it is then determined whether or not the output VO2 is lower than the reference value VREF (step S145). If VO2 is lower than VREF in step S145, an integral term IR is added to the correction coefficient KO2 to thereby update the correction coefficient KO2 (step S146). If VO2 is higher than VREF in step S145, an integral term IL is subtracted from the correction coefficient KO2 to thereby update the correction coefficient KO2 (step S147). Then, this method ends.

Thus, the air-fuel ratio correction coefficient KO2 is set according to the output VO2 from the O2 sensor 14. Accordingly, when the value of the EGR correction coefficient KEGR is too small to cause excessive correction, the value of the air-fuel ratio correction coefficient KO2 becomes large so as to correct excessive correction. Accordingly, by comparing the difference DKO2 between the average KO2WTEGR of the air-fuel ratio correction coefficient KO2 during execution of the exhaust gas recirculation and the average KO2WOEGR of the air-fuel ratio correction coefficient KO2 during non-execution of the exhaust gas recirculation, with the predetermined value DKO2EGRF, it is possible to determine whether or not the correction by the EGR correction coefficient KEGR is excessive correction.

According to the preferred embodiment as described above, the deterioration correction coefficient KEGRFLOW is calculated according to the intake pressure change DPBEGR corresponding to the pressure difference between the intake pressure during execution of the exhaust gas recirculation by opening the EGR valve 22 and the intake pressure during non-execution of the exhaust gas recirculation by closing the EGR valve 22. The fuel supply amount is corrected to increase with a decrease in the intake pressure change DPBEGR, i.e., with the progress of deterioration of the exhaust gas recirculation mechanism. Accordingly, the excessive correction by the EGR correction coefficient KEGR can be eliminated to make the fuel supply amount proper according to the degree of deterioration, so that good exhaust emission characteristics can be maintained over a long period of time.

Figure 13:
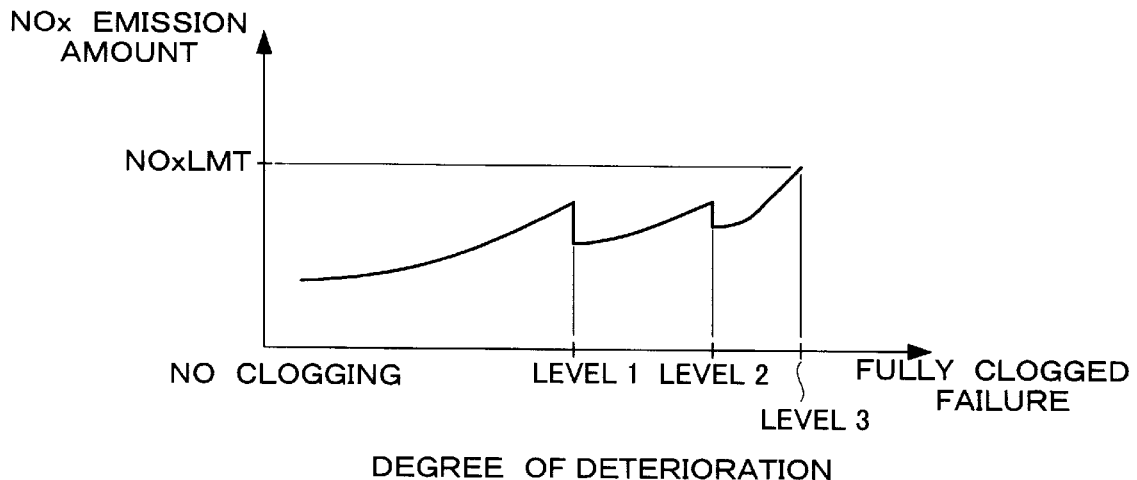
FIG. 13 is a graph for illustrating the effect of correction by the deterioration correction coefficient (KEGRFLOW).

FIG. 13 is a graph for illustrating this point more specifically, in which the horizontal axis represents the degree of deterioration of the exhaust gas recirculation mechanism, that is, the level of clogging of the exhaust gas recirculation passage 21 or the EGR valve 22, and the vertical axis represents the NOx emission amount. As apparent from FIG. 13, the NOx emission amount increases with an increase in the degree of deterioration, and approaches a limit value NOxLMT. When the degree of deterioration reaches Level 1, the intake pressure change DPBEGR is obtained by opening and closing the EGR valve 22 and the deterioration correction coefficient KEGRFLOW is calculated according to the intake pressure change DPBEGR. By applying the calculated deterioration correction coefficient KEGRFLOW to Eq. (1), the excessive correction by the EGR correction coefficient KEGR is eliminated and the NOx emission amount therefore decreases stepwise. Thereafter, the NOx emission amount gradually increases as the degree of deterioration further increases. At the time the degree of deterioration reaches Level 2, the deterioration correction coefficient KEGRFLOW is calculated and applied to Eq. (1) as at the deterioration degree of Level 1. As a result, the NOx emission amount decreases stepwise. Thereafter, when the degree of deterioration further increases to reach Level 3, it is determined that the EGR flow is abnormal (see step S73 in FIG. 5).

By using the deterioration correction coefficient KEGRFLOW as mentioned above, it is possible to reduce the NOx emission amount in the deteriorated condition before reaching the degree of deterioration (Level 3) where the EGR flow is determined to be abnormal, to thereby maintain good exhaust emission characteristics over a long period of time.

Further, when the difference DKO2 between the average KO2WTEGR of the air-fuel ratio correction coefficient KO2 calculated during execution of the exhaust gas recirculation and the average KO2WOEGR of the air-fuel ratio correction coefficient KO2 calculated during non-execution of the exhaust gas recirculation becomes greater than the predetermined value DKO2EGRF, it is determined that the exhaust gas recirculation mechanism is deteriorated. Therefore, the deterioration of the exhaust gas recirculation mechanism (the deterioration of such a degree that the mechanism has not apparently failed) can be accurately determined. When the deterioration of the exhaust gas recirculation mechanism is determined, the fuel supply correction by the deterioration correction coefficient KEGRFLOW is executed to thereby correct the fuel supply amount (air-fuel ratio) into a proper value and improve the exhaust emission characteristics.

In this preferred embodiment, the ECU 5 and the fuel injection valves 6 constitute the fuel supply control system, and the CPU 5$b$ of the ECU 5 constitutes correcting means, air-fuel ratio correcting means, and deterioration determining means, or the CPU 5$b$ constitutes a correcting module, an air-fuel ratio correcting module, and a deterioration determining module. More specifically, the processing of FIG. 5 and step S106 in FIG. 9 correspond to the correcting means or the correcting module. The processing of FIG. 3 and the processing of FIG. 12 correspond to the air-fuel ratio correcting means or the air-fuel ratio correcting module. Steps S101 to S105 in FIG. 9 correspond to deterioration determining means or deterioration determining module.

In this preferred embodiment, the fuel supply amount (fuel injection period TOUT) is corrected by using Eq. (1) and the deterioration correction coefficient KEGRFLOW. However, the present invention is not limited to this preferred embodiment. For example, the fuel injection period TOUT may be corrected by using Eq. (1a) shown below and a deterioration correction coefficient KEGRFLOWA.

$$TOUT = TIM \times KO2 \times KEGR \times KEGRFLOWA \times KTOTAL \tag{1a}$$

In this case, the deterioration correction coefficient KEGRFLOWA is set to "1.0" (non-correction value) when the intake pressure change DPBEGR is large, and set to a value increasing with a decrease in the intake pressure change DPBEGR.

Further, a modified EGR correction coefficient KEGRM that is the product of (KEGR×KEGRFLOWA) may be introduced. That is, the modified EGR correction coefficient KEGRM is calculated by modifying the EGR correction coefficient KEGR according to the degree of deterioration of the exhaust gas recirculation mechanism.

In this preferred embodiment, a binary type oxygen concentration sensor having a characteristic such that its output rapidly changes in the vicinity of a stoichiometric ratio is used as the air-fuel ratio sensor. A proportional type oxygen concentration sensor having a characteristic such that its output is substantially proportional to an air-fuel ratio may be used. In this case, the air-fuel ratio correction coefficient is set by PID (Proportional, Integral, Differential) control to make a detected air-fuel ratio coincide with a target air-fuel ratio.

What is claimed is:

1. A fuel supply control system for controlling a fuel amount to be supplied to an internal combustion engine having an exhaust gas recirculation mechanism comprising an exhaust gas recirculation passage connected between an intake pipe and an exhaust pipe, and an exhaust gas recirculation valve provided in said exhaust gas recirculation passage, said fuel supply control system including, an intake pressure sensor for detecting an intake pressure of said engine;

deterioration detecting means for determining a degree of deterioration of said exhaust gas recirculation mechanism according to a pressure difference between an intake pressure detected when opening said exhaust gar recirculation valve and an intake pressure detected when closing said exhaust gas recirculation valve; and correcting means for correcting the fuel amount to be supplied to said engine according to the degree of deterioration of said exhaust gas recirculation mechanism as determined by said deterioration detecting.

2. A fuel supply control system according to claim 1, wherein said correcting means corrects said fuel amount so that said fuel amount increases with a decrease in the pressure difference.

3. A fuel supply control system according to claim 1, wherein said correcting means meaures said pressure difference when the fuel supply to said engine is interrupted.

4. A fuel supply control system according to claim 1, further including an engine rotational speed sensor for detecting a rotational speed of said engine, wherein said correcting means corrects the pressure difference according to the detected rotational speed of said engine, and corrects said fuel amount according to the corrected pressure difference.

5. A fuel supply control system according to claim 1, further including:
   an air-fuel ratio sensor provided in said exhaust pipe;
   an air-fuel ratio correcting means for calculating an air-fuel ratio correction coefficient according to an output from said air-fuel ratio sensor and correcting said fuel amount by using the calculated air-fuel ratio correction coefficient; and
   deterioration determining means for determining deterioration of said exhaust gas recirculation mechanism according to a difference between said air-fuel ratio correction coefficient calculated during a period of opening said exhaust gas recirculation valve and said air-fuel ratio correction coefficient calculated during a period of closing said exhaust gas recirculation valve,
   wherein said correcting means corrects the fuel amount when said deterioration determining means determines that said exhaust gas recirculation mechanism is deteriorated.

6. A fuel supply control system according to claim 5, wherein said deterioration determining means has means for calculating a first average of said air-fuel ratio correction coefficient during the period of opening said exhaust gas recirculation valve and means for calculating a second average of said air-fuel ratio correction coefficient during the period of closing said exhaust gas recirculation valve, and calculates the difference by using the first and second averages.

7. A fuel supply control system for controlling a fuel amount to be supplied to an internal combustion engine having an exhaust gas recirculation mechanism comprising an exhaust gas recirculation passage connected between an intake pipe and an exhaust pipe, and an exhaust gas recirculation valve provided in relation to said exhaust gas recirculation passage, said fuel supply control system comprising,
   an air-fuel ratio sensor provided in said exhaust pipe;
   an air-fuel ratio correcting means for calculating an air-fuel ratio correction coefficient according to an output from said air-fuel ratio sensor and correcting the fuel amount by using the calculated air-fuel ratio correction coefficient;
   deterioration determining means for determining deterioration of said exhaust gas recirculation mechanism according to a difference between the air-fuel ratio correction coefficient calculated during a period of opening said exhaust gas recirculation valve and the air-fuel ratio correction coefficient calculated during a period of closing said exhaust gas recirculation valve; and
   correcting means for correcting said fuel amount according to a degree of deterioration of said exhaust gas recirculation mechanism when the difference becomes greater than a predetermined value.

8. A fuel supply control system according to claim 7, wherein said deterioration determining means has means for calculating a first average of the air-fuel ratio correction coefficient when opening said exhaust gas recirculation valve and means for calculating a second average of the air-fuel ratio correction coefficient when closing said exhaust gas recirculation valve, and calculates said difference by using said first and second averages.

9. A fuel supply control system according to claim 7, further comprising an intake pressure sensor for detecting an intake pressure of said engine, wherein said correcting means uses a pressure difference between an intake pressure detected when opening said exhaust gas recirculation valve and an intake pressure detected when closing said exhaust gas recirculation valve, as a parameter indicating the degree of deterioration of said exhaust gas recirculation mechanism.

10. A fuel supply control system according to claim 9, wherein said correcting means corrects said fuel amount so that the fuel amount increases with a decrease in the pressure difference.

11. A fuel supply control system according to claim 9, wherein said correcting means measures said pressure difference when the fuel supply to said engine is interrupted.

12. A fuel supply control system according to claim 9, further including an engine rotational speed sensor for detecting a rotational speed of said engine, wherein said correcting means corrects the pressure difference according to the detected rotational speed of said engine, and corrects said fuel amount according to the corrected pressure difference.

13. A fuel supply control system for controlling a fuel amount to be supplied to an internal combustion engine having an exhaust gas recirculation mechanism comprising an exhaust gas recirculation passage connected between an intake pipe and an exhaust pipe, and an exhaust gas recirculation valve provided in said exhaust gas recirculation passage, said fuel supply control system including,
   an intake pressure sensor for detecting an intake pressure of said engine;
   deterioration detecting module for determining a degree of deterioration of said exhaust gas recirculation mechanism according to a pressure difference between an intake pressure detected when opening said exhaust gas recirculation valve and an intake pressure detected when closing said exhaust gas recirculation valve; and
   a correcting module for correcting the fuel amount to be supplied to said engine according to the degree of deterioration of said exhaust gas recirculation mechanism as determined by said deterioration detecting module.

14. A fuel supply control system according to claim 13, wherein said correcting module corrects said fuel amount so that said fuel amount increases with a decrease in the pressure difference.

15. A fuel supply control system according to claim 13, wherein said correcting module meaures said pressure difference when the fuel supply to said engine is interrupted.

16. A fuel supply control system according to claim 13, further including an engine rotational speed sensor for detecting a rotational speed of said engine, wherein said correcting module corrects the pressure difference according to the detected rotational speed of said engine, and corrects said fuel amount according to the corrected pressure difference.

17. A fuel supply control system according to claim 13, further including:
   an air-fuel ratio sensor provided in said exhaust pipe;
   an air-fuel ratio correcting module for calculating an air-fuel ratio correction coefficient according to an output from said air-fuel ratio sensor and correcting said fuel amount by using the calculated air-fuel ratio correction coefficient; and
   a deterioration determining module for determining deterioration of said exhaust gas recirculation mechanism according to a difference between said air-fuel ratio correction coefficient calculated during a period of opening said exhaust gas recirculation valve and said air-fuel ratio correction coefficient calculated during a period of closing said exhaust gas recirculation valve, wherein said correcting module corrects the fuel amount when said deterioration determining module determines that said exhaust gas recirculation mechanism is deteriorated.

18. A fuel supply control system according to claim 17, wherein said deterioration determining module has a module for calculating a first average of said air-fuel ratio correction coefficient during the period of opening said exhaust gas recirculation valve and a module for calculating a second average of said air-fuel ratio correction coefficient during the period of closing said exhaust gas recirculation valve, and calculates the difference by using the first and second averages.

19. A fuel supply control system for controlling a fuel amount to be supplied to an internal combustion engine having an exhaust gas recirculation mechanism comprising an exhaust gas recirculation passage connected between an intake pipe and an exhaust pipe, and an exhaust gas recirculation valve provided in relation to said exhaust gas recirculation passage, said fuel supply control system comprising, an air-fuel ratio sensor provided in said exhaust pipe;

an air-fuel ratio correcting module for calculating an air-fuel ratio correction coefficient according to an output from said air-fuel ratio sensor and correcting the fuel amount by using the calculated air-fuel ratio correction coefficient;

deterioration determining module for determining deterioration of said exhaust gas recirculation mechanism according to a difference between the air-fuel ratio correction coefficient calculated during a period of opening said exhaust gas recirculation valve and the air-fuel ratio correction coefficient calculated during a period of closing said exhaust gas recirculation valve; and fuel correcting module for correcting said fuel amount according to a degree of deterioration of said exhaust gas recirculation mechanism when the difference becomes greater than a predetermine value.

20. A fuel supply control system according to claim 19, wherein said deterioration determining module has a module for calculating a first average of the air-fuel ratio correction coefficient when opening said exhaust gas recirculation valve and a module for calculating a second average of the air-fuel ratio correction coefficient when closing said exhaust gas recirculation valve, and said deterioration determining module calculates said difference by using said first and second averages.

21. A fuel supply control system according to claim 19, further comprising an intake pressure sensor for detecting an intake pressure of said engine, wherein said correcting module uses a pressure difference between an intake pressure detected when opening said exhaust gas recirculation valve and an intake pressure detected when closing said exhaust gas recirculation valve, as a parameter indicating the degree of deterioration of said exhaust gas recirculation mechanism.

22. A fuel supply control system according to claim 21, wherein said correcting module corrects said fuel amount so that the fuel amount increases with a decrease in the pressure difference.

23. A fuel supply control system according to claim 21, wherein said correcting module measures said pressure difference when the fuel supply to said engine is interrupted.

24. A fuel supply control system according to claim 19, further including an engine rotational speed sensor for detecting a rotational speed of said engine, wherein said correcting module corrects the pressure difference according to the detected rotational speed of said engine, and corrects said fuel amount according to the corrected pressure difference.

25. A fuel supply control method for controlling a fuel amount to be supplied to an internal combustion engine having an exhaust gas recirculation mechanism comprising an exhaust gas recirculation passage connected between an intake pipe and an exhaust pipe, and an exhaust gas recirculation valve provided in said exhaust gas recirculation passage, said fuel supply control method comprising the steps of:

a) detecting an intake pressure of said engine;

b) determining a degree of deterioration of said exhaust gas recirculation mechanism according to a pressure difference between an intake pressure detected when opening said exhaust gas recirculation valve and an intake pressure detected when closing said exhaust gas recirculation valve; and c) correcting the fuel amount to be supplied to said engine according to the degree of deterioration of said exhaust gas recirculation mechanism.

26. A fuel supply control method according to claim 25, wherein the fuel amount is corrected so that the fuel amount increases with a decrease in the pressure difference.

27. A fuel supply control method according to claim 25, wherein the pressure difference is measured when the fuel supply to said engine is interrupted.

28. A fuel supply control method according to claim 25, further comprising the step of detecting a rotational speed of said engine, wherein the pressure difference is corrected according to the detected rotational speed of said engine, and the fuel amount is corrected according to the corrected pressure difference.

29. A fuel supply control method according to claim 25, further comprising the steps of:

c) detecting an air-fuel ratio by an air-fuel ratio sensor provided in said exhaust pipe;

d) calculating an air-fuel ratio correction coefficient according to the detected air-fuel ratio;

e) correcting the fuel amount by using the calculated air-fuel ratio correction coefficient; and f) determining deterioration of said exhaust gas recirculation mechanism according to a difference between said air-fuel ratio correction coefficient calculated during a period of opening said exhaust gas recirculation valve and said air-fuel ratio correction coefficient calculated during a period of closing said exhaust gas recirculation valve, wherein the fuel amount is corrected according to the pressure difference when it is determined that said exhaust gas recirculation mechanism is deteriorated.

30. A fuel supply control method according to claim 29, wherein the step f) of determining deterioration of said exhaust gas recirculation mechanism comprises the steps of calculating a first average of said air-fuel ratio correction coefficient during the period of opening said exhaust gas recirculation valve and calculating a second average of said air-fuel ratio correction coefficient during the period of closing said exhaust gas recirculation valve, and the difference is calculated by using the first and second averages.

31. A fuel supply control method for controlling a fuel amount to be supplied to an internal combustion engine having an exhaust gas recirculation mechanism comprising an exhaust gas recirculation passage connected between an intake pipe and an exhaust pipe, and an exhaust gas recirculation valve provided in relation to said exhaust gas recirculation passage, said fuel supply control method comprising the steps of, a) detecting an air-fuel ratio by an air-fuel ratio sensor provided in said exhaust pipe;

b) calculating an air-fuel ratio correction coefficient according to the detected air-fuel ratio;

c) correcting the fuel amount by using the calculated air-fuel ratio correction coefficient;

d) determining deterioration of said exhaust gas recirculation mechanism according to a difference between the air-fuel ratio correction coefficient calculated during a period of opening said exhaust gas recirculation valve and the air-fuel ratio correction coefficient calculated during a period of closing said exhaust gas recirculation valve; and e) adjusting the fuel amount to the internal combustion engine according to a degree of deterioration of said exhaust gas recirculation mechanism when the difference becomes greater than a predetermined value.

32. A fuel supply control method according to claim 31, wherein the step d) of determining deterioration of said exhaust gas recirculation mechanism comprises the steps of calculating a first average of said air-fuel ratio correction coefficient during the period of opening said exhaust gas recirculation valve and calculating a second average of said air-fuel ratio correction coefficient during the period of closing said exhaust gas recirculation valve, and the difference is calculated by using the first and second averages.

33. A fuel supply control method according to claim 31, further comprising the step of detecting an intake pressure of said engine, wherein a pressure difference between an intake pressure detected when opening said exhaust gas recirculation valve and an intake pressure detected when closing said exhaust gas recirculation valve, is used as a parameter indicating the degree of deterioration of said exhaust gas recirculation mechanism.

34. A fuel supply control method according to claim 33, wherein the fuel amount is corrected so that the fuel amount increases with a decrease in the pressure difference.

35. A fuel supply control method according to claim 33, wherein the pressure difference is measured when the fuel supply to said engine is interrupted.

36. A fuel supply control method according to claim 31, further comprising a step of detecting a rotational speed of said engine, wherein the pressure difference is corrected according to the detected rotational speed of said engine, and the fuel amount is corrected according to the corrected pressure difference.

37. A fuel supply control system for controlling a fuel amount to be supplied to an internal combustion engine having an exhaust gas recirculation mechanism comprising an exhaust gas recirculation passage connected between an intake pipe and an exhaust pipe, and an exhaust gas recirculation valve provided in said exhaust gas recirculation passage, said fuel supply control system including:

an intake pressure sensor for detecting an intake pressure of said engine;

correcting means for correcting the fuel amount to be supplied to said engine according to a pressure difference between an intake pressure detected when opening said exhaust gas recirculation valve and an intake pressure detected when closing said exhaust gas recirculation valve;

an air-fuel ratio sensor provided in said exhaust pipe;

an air-fuel ratio correcting means for calculation an air-fuel ratio correction coefficient according to an output from said air-fuel ratio sensor and correcting said fuel amount by using the calculated air-fuel ratio correction coefficient; and deterioration determining means for determining deterioration of said exhaust gas recirculation mechanism according to a difference between said air-fuel ratio correction coefficient calculated during a period of opening said exhaust gar recirculation valve and said air-fuel ratio correction coefficient calculated during a period of closing said exhaust gas recirculation valve, wherein said correcting means corrects the fuel amount when said deterioration determining means determines that said exhaust gas recirculation mechanism is deteriorated.

38. A fuel supply control system according to claim 37, further including an engine rotational speed sensor for detecting a rotational speed of said engine, wherein said correcting means corrects the pressure difference according to the detected rotational speed of said engine, and corrects said fuel amount according to the corrected pressure difference.

39. A fuel supply control system for controlling a fuel amount to be supplied to an internal combustion engine having an exhaust gas recirculation mechanism comprising an exhaust gas recirculation passage connected between an intake pipe and an exhaust pipe, and an exhaust gas recirculation valve provided in said exhaust gas recirculation passage, said fuel supply control system including;

an intake pressure sensor for detecting an intake pressure of said engine;

a correcting module for correcting the fuel amount to be supplied to said engine according to a pressure difference between an intake pressure detected when opening said exhaust gas recirculation valve and an intake pressure detected when closing said exhaust gas recirculation valve;

an air-fuel ratio sensor provided in said exhaust pipe; an air-fuel ratio correcting module for calculating an air-fuel ratio correction coefficient according to an output from said air-fuel ratio sensor and correcting said fuel amount by using the calculated air-fuel ratio correction coefficient; and a deterioration determining module for determining deterioration of said exhaust gas recirculation mechanism according to a difference between said air-fuel ratio correction coefficient calculated during a period of opening said exhaust gas recirculation valve and said air-fuel ratio correction coefficient calculated during a period of closing said exhaust gas recirculation valve, wherein said correcting module corrects the fuel amount when said deterioration module determines that said exhaust gas recirculation mechanism is deteriorated.

40. A fuel supply control system to claim 39, further including an engine rotational speed sensor for detecting a rotational speed of said engine, wherein said correcting module corrects the pressure difference according to the detected rotational speed of said engine, and corrects said fuel amount according to the corrected pressure difference.

41. A fuel supply control method for controlling a fuel amount to be supplied to an internal combustion engine having an exhaust gas recirculation mechanism comprising an exhaust gas recirculation passage connected between an intake pipe and an exhaust pipe, and an exhaust gas recirculation valve provided in said exhaust gas recirculation passage, said fuel supply control method comprising the steps of:

- detecting an intake pressure of said engine;
- correcting the fuel amount to be supplied to said engine according to a pressure difference between an intake pressure detected when opening said exhaust gas recirculation valve and an intake pressure detected when closing said exhaust gas recirculation valve;
- detecting an air-fuel ratio by an air-fuel sensor provided in said exhaust pipe;
- calculating an air-fuel ratio correction coefficient according to the detected air-fuel ratio;
- correcting the fuel amount by using the calculated air-fuel ratio correction coefficient; and
- determining deterioration of said exhaust gas recirculation mechanism according to a difference between said air-fuel ratio correction coefficient calculated during a period of opening said exhaust gas recirculation valve and said air-fuel ratio correction coefficient calculated during a period of closing said exhaust gas recirculation valve;

wherein the fuel amount is corrected according to the pressure difference when it is determined that said exhaust gas recirculation mechanism is deteriorated.

42. A fuel supply control method according to claim 41, further comprising the step of detecting a rotational speed of said engine, wherein the pressure difference is corrected according to the detected rotational speed of said engine, and the fuel amount is corrected according to the corrected pressure difference.

* * * * *

UNITED STATES PATENT AND TRADEMARK OFFICE
CERTIFICATE OF CORRECTION

PATENT NO. : 6,564,778 B2
DATED : May 20, 2003
INVENTOR(S) : Isobe et al.

It is certified that error appears in the above-identified patent and that said Letters Patent is hereby corrected as shown below:

Column 5,
Line 22, replace "the 2 sensor" with -- the O2 sensor --;
Line 25, replace "the ECUS" with -- the ECU 5 --;

Column 6,
Line 64, replace "performed(step 12)" with -- performed (step 12) --;

Column 9,
Line 17, replace "flag fegropen when" with -- flag fegropn when --;

Column 10,
Line 5, replace: "DPBEGRBF·PBEGRBF·DPBEGRAF" with
-- DPBEGRBF-PBEGRBF-DPBEGRAF --;

Column 12,
Line 36, indent starting a new paragraph: "Then, it is";

Column 16,
Line 47, replace "said exhaust gar" with -- said exhaust gas --;

Column 18,
Line 13, replace "according to claim 9" with -- according to claim 10 --;
Line 63, replace "a deterioration" with -- deterioration --;

Column 19,
Line 42, replace "a predetermine value" with -- a predetermined value --;

UNITED STATES PATENT AND TRADEMARK OFFICE
CERTIFICATE OF CORRECTION

PATENT NO. : 6,564,778 B2
DATED : May 20, 2003
INVENTOR(S) : Isobe et al.

It is certified that error appears in the above-identified patent and that said Letters Patent is hereby corrected as shown below:

<u>Column 22,</u>
Line 41-42, replace "exhaust pipe; an" with -- exhaust pipe; ¶ an -- where "an" starts a new paragraph;
Line 57, replace "system to claim" with -- system according to claim --.

Signed and Sealed this

Twentieth Day of April, 2004

JON W. DUDAS
*Acting Director of the United States Patent and Trademark Office*